US011044662B2

(12) United States Patent
Xu et al.

(10) Patent No.: US 11,044,662 B2
(45) Date of Patent: Jun. 22, 2021

(54) APPARATUS, METHOD, AND COMPUTER PROGRAM FOR TRANSCEIVERS OF A MOBILE COMMUNICATION SYSTEM

(71) Applicant: Apple Inc., Cupertino, CA (US)

(72) Inventors: Wen Xu, Neubiberg (DE); Xiaojun Ma, Munich (DE); Michael Faerber, Wolfratshausen (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/508,409

(22) Filed: Jul. 11, 2019

(65) Prior Publication Data
US 2020/0008135 A1    Jan. 2, 2020

Related U.S. Application Data

(63) Continuation of application No. 15/572,844, filed as application No. PCT/IB2016/053358 on Jun. 8, 2016, now Pat. No. 10,368,300.

(30) Foreign Application Priority Data

Jun. 26, 2015  (DE) .................. 102015110358.3

(51) Int. Cl.
H04W 48/16      (2009.01)
H04L 25/02      (2006.01)
(Continued)

(52) U.S. Cl.
CPC ......... H04W 48/16 (2013.01); H04L 25/0238 (2013.01); H04W 48/10 (2013.01); H04W 56/001 (2013.01); H04W 84/047 (2013.01)

(58) Field of Classification Search
CPC ... H04W 48/16; H04W 48/10; H04W 56/001; H04L 25/0238
See application file for complete search history.

(56) References Cited

U.S. PATENT DOCUMENTS 9,143,955 B2    9/2015 Zhang et al.
10,219,265 B2 *  2/2019 You .................. H04L 5/005
(Continued)

FOREIGN PATENT DOCUMENTS

CN    102449920 A    5/2012
CN    102572970 A    7/2012
(Continued)

OTHER PUBLICATIONS

Second Office Action from Chinese Patent Application No. 201680030604.8, dated Jan. 14, 2021, 11 pgs.

Primary Examiner — Chandrahas B Patel
(74) Attorney, Agent, or Firm — Kowert, Hood, Munyon, Rankin & Goetzel, P.C.

(57) ABSTRACT

An apparatus for a transceiver of a mobile communication system includes an interface configured to obtain receive signal information. The apparatus further includes a control module configured to determine a first cell identifying information of the mobile communication system based on the receive signal information, and configured to estimate an interfering signal information transmitted by a second cell of the mobile communication system based on the receive signal information. The interfering signal comprises control or payload data information of a second transceiver. The control module is further configured to detect a synchronization signal information transmitted for the cell based on the receive signal information and the interfering signal information. The control module is further configured to identify the first cell identifying information based on the synchronization signal information.

19 Claims, 20 Drawing Sheets

(51) Int. Cl.
*H04W 48/10* (2009.01)
*H04W 56/00* (2009.01)
*H04W 84/04* (2009.01)

(56) References Cited

U.S. PATENT DOCUMENTS

| | | |
|---|---|---|
| 2014/0301268 A1 | 10/2014 | Xu et al. |
| 2014/0369262 A1 | 12/2014 | Roh et al. |
| 2014/0369269 A1 | 12/2014 | Farkas et al. |
| 2015/0148089 A1 | 5/2015 | Chirayil |

FOREIGN PATENT DOCUMENTS

| | | |
|---|---|---|
| CN | 103581069 A | 2/2014 |
| CN | 103918234 A | 7/2014 |
| CN | 104079511 A | 10/2014 |
| WO | 2009064678 A1 | 5/2009 |
| WO | 2010006285 A2 | 1/2010 |
| WO | 2011140511 A1 | 11/2011 |
| WO | 2012092060 A1 | 7/2012 |
| WO | 2013155643 A1 | 10/2013 |

\* cited by examiner

APPARATUS, METHOD, AND COMPUTER PROGRAM FOR TRANSCEIVERS OF A MOBILE COMMUNICATION SYSTEM

CROSS-REFERENCE TO RELATED APPLICATIONS

This application is a continuation of U.S. application Ser. No. 15/572,844, filed Nov. 9, 2017, now U.S. Pat. No. 10,368,300. U.S. Pat. No. 10,368,300 was a 35 U.S.C. § 371(c) national stage entry of PCT/IB2016/053358, which claimed priority to German Application 102015110358.3, filed Jun. 26, 2015. The contents of the earlier filed applications are incorporated by reference herein in their entirety.

FIELD

Examples relate to wireless communication concepts and in particular, but not exclusively, to apparatus, method and computer program enabling interference cancellation during cell search procedures.

BACKGROUND

The demand on ever increasing data and network capacity generates heterogeneous networks with a growing variety of different cell types. Cell types may differ in their coverage areas, access types, capacity, standards, user groups etc. Therefore, it is desired to provide an improved concept for cell search procedures carried out by terminals or relay stations in wireless networks, as interference may become stronger and more complex.

BRIEF DESCRIPTION OF THE FIGURES

Some examples of apparatuses and/or methods and/or computer programs will be described in the following by way of example only, and with reference to the accompanying figures, in which.

DETAILED DESCRIPTION

Figure 1:
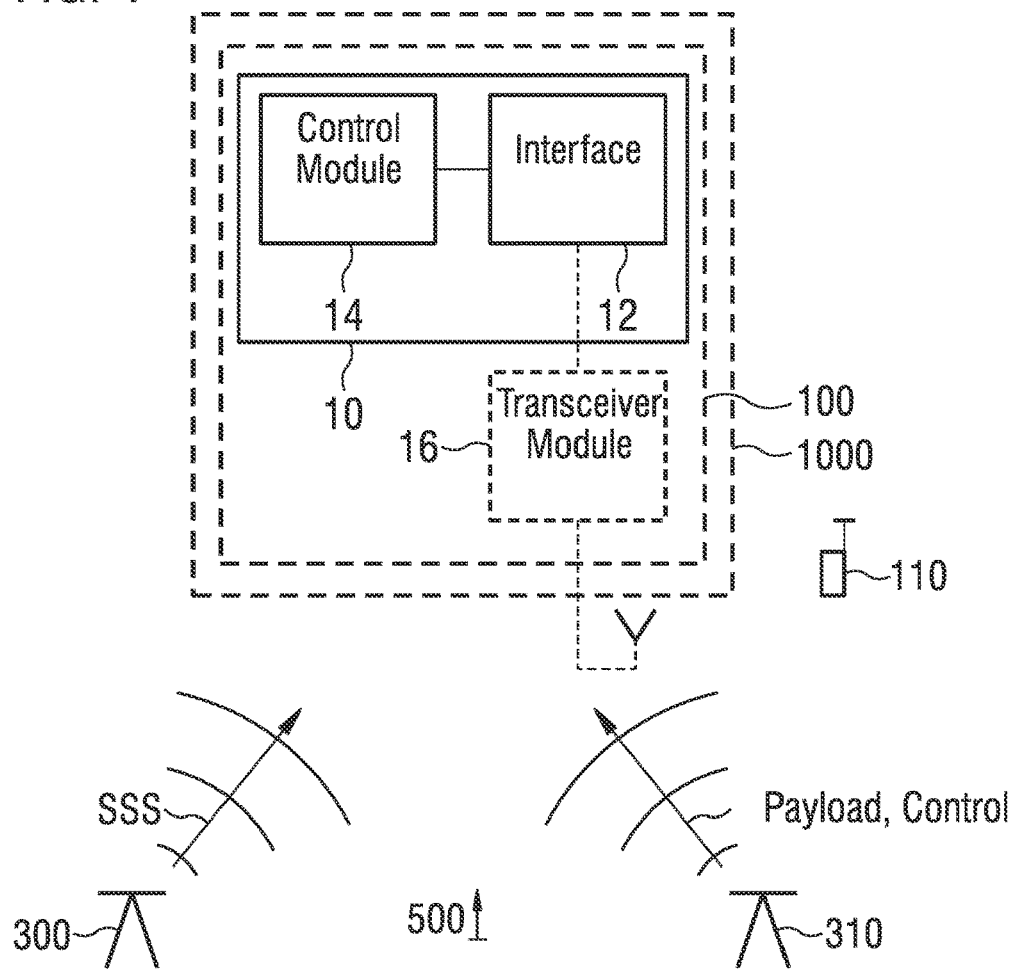
FIG. 1 illustrates an example of an apparatus for a transceiver of a mobile communication system.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art, unless expressly defined otherwise herein.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (EU-TRAN), Long Term Evolution (LTE) or LTE-Advanced (LTE-A), a fourth generation (4G) system, a fifth generation (5G) system, or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 illustrates an example of an apparatus 10 for a first transceiver 100 of a mobile communication system 500. The mobile communication system 500 may correspond to one of the above referenced systems. The apparatus comprises an interface 12 configured to obtain information related to a receive signal or receive signal information. The receive signal may be based on at least two transmit signals of cells 300, 310 of the mobile communication system 500. In FIG. 1 the two cells 300, 310 are represented by symbolized base station transceivers 300, 310, where it is to be noted that a base station transceiver may provide or generate multiple cells in some examples. Here and in the following the terms base station transceiver and cell may be used synonymously.

The interface 12 may correspond to one or more inputs and/or outputs for receiving and/or transmitting information or signals, which may be in digital (bit) values according to a specified code or analogue, within a module, between modules or between modules of different entities. The interface 12 may hence follow any protocol or specification and may correspond to any wireline or wireless input or output of the apparatus 10. The interface may correspond to any means for interfacing, one or more interface modules, one or more interface units, one or more interface devices, any means for obtaining or providing, an obtainer or provider, one or e more provision units, one or more provision modules, one or more provision devices, one or more obtaining module, one or more obtaining units, one or more obtaining devices, etc. The apparatus 10 further comprises a control module 14, which is coupled to the interface 12.

In examples the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

The control module 14 is configured to determine information related to an identification (or first cell 300 identifying information) of a first cell 300 of the mobile communication system 500 based on the receive signal information. An identification of a cell may correspond to an identifier or an address, which may be at least locally, i.e. among a locally available number of cells, unique. For example, such identification might not be globally, i.e. throughout the entire mobile communication system 500, unique, but among a group of, for example, 10, 50 or 100 cells. In some examples a number of identifications may be limited (for example using a limited number of digits) and may hence be reused within the mobile communication system 500.

The control module 14 is further configured to estimate information related to an interfering signal (or interfering signal information) transmitted by a second cell 310, which is also symbolized by a base station transceiver in FIG. 1, of the mobile communication system 500 based on the receive signal information. The interfering signal comprises information related to control and/or payload data (or control or payload data information) of a second transceiver 110. The second transceiver 110 may, for example, correspond to a mobile transceiver.

The control module 14 is further configured to detect information related to a synchronization signal (or synchronization signal information) transmitted for the first cell 300 based on the receive signal information and the interfering signal information. The control module 14 is further configured to identify the first cell 300 identifying information based on the synchronization signal information. Examples may enable cancellation or reduction of interference in a receive signal comprising a synchronization signal or channel caused by transmission of payload or control data of other cells. Examples may enable cell search with data or control interference cancellation or reduction, for example, in LTE-A or beyond technologies. Examples may be used in 5G concepts, cell search further enhanced inter-cell interference calculation, cell search in HetNet scenarios, cell search of weak cells, LTE-A receivers, UE receivers, etc.

Another example is a transceiver 100 comprising an example of the above apparatus 10, as indicated as optional component in FIG. 1 (optional components use dashed lines). In further examples the transceiver 100 may further comprise a transceiver module 16 configured to receive the receive signal, wherein the transceiver module 16 is coupled to the interface 12, as indicated by the optional components (dashed lines) shown in FIG. 1. The transceiver module 16 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. Another example is a mobile transceiver 1000 comprising an example of the transceiver 100 as indicated as optional component in FIG. 1.

In cellular systems, synchronization may be the very first task when a UE tries to establish a connection with a base station, say, an evolved NodeB (eNB) in terms of the 3GPP LTE and LTE-A. Usually, multiple cells may be searched for initial cell search (say, at call setup), and intra- and inter-frequency neighbor cell search for handover. In LTE/LTE-A and future 5G systems, multiple cells can be time synchronous or asynchronous. In 4G or LTE-A, such as in the case of Rel.11 FeICIC, a UE may detect weak cells with a Signal-to-Interference-and-Noise-Ratio (SINR) lower than −11.2 dB. For future 5G systems under discussion, such as in ultra-dense networks, still stronger and more complex interference may be expected. When multiple cells are partially or fully loaded, detection of a weak cell may become more difficult since the weak target cell can be interfered not only by known pilot signals but also by unknown data and/or control signaling from other cells. This may be considered as a bottleneck scenario limiting the cell search performance in LTE/LTE-A and probably in 5G. Examples may allow an improved cell search method; some examples may use blind detection and cancelling or reducing of the data and/or control signaling of the interfering cells. A modulation order information of an interfering symbol, which may be identified as necessary side information for detection in some examples, may first be blindly detected.

Based on this, the interfering symbol is then demodulated and cancelled in some examples. Some analysis and simulations showed that the proposed cell searcher has excellent performances even if the blind detection is erroneous, and can be used for FDD and TDD LTE/LTE-A synchronous and asynchronous networks. For two-cell scenarios, target cells with SINR lower than −20 dB may be reliably detected. Moreover, network configurations may be used in some examples to support efficient cell search with data/control interference cancellation.

In some examples, a cell searcher may blindly detect and cancel control and/or user data of an interfering cell. Based on this, the interfering symbol may then be demodulated and cancelled. The mobile network may be configured such that the UE can easily and efficiently do blind modulation order detection and symbol cancellation for (control and/or user) data from strong interfering cells.

When cells are not fully synchronized, which happens even for synchronous networks, the synchronization signal (such as symbols from synchronization channels, e.g. the Secondary Synchronization Signal (SSS) as defined by 3GPP) of a target cell is usually interfered also by control and/or user data from other interfering cells. Since these control and/or user data are usually unknown to the UE, they may be difficult to mitigate.

In the following some further examples will be detailed. In some cellular systems, synchronization may be the very first task when a UE tries to establish a connection with a base station. In LTE and LTE-A, the system synchronization is usually accomplished first in the DownLink (DL) and then in the UpLink (UL). Concretely, the UE may perform an initial time and frequency offset estimation by detecting synchronization signals of eNBs. When this is successful, the UE can acquire a frame structure of the DL signal and cell Identities (IDs) of strong cells, decoding the Physical Broadcast CHannel (PBCH) signal, and read basic system information (e.g. DL bandwidth, etc.). In some examples the control module 14 as shown in FIG. 1, may be configured to determine the identification (identify the first cell) of the cell as part of a cell search procedure before accessing a data service of the mobile communication system 500. In some examples the control module 14 is configured to identify a plurality of cell identification information using reception quality measures for a plurality of synchronization channels. After this, the UE may transmit back a Physical Random Access CHannel (PRACH) signal. The eNB may then detect the PRACH, estimate the transmit timing of the UE, identify the UE, etc., and finally establish a connection with the UE.

In examples synchronization signals and cell IDs may be used, which can be coded or implemented in different ways. For example, a total of 504 cell IDs may be defined in LTE/LTE-A as $$N_{ID}^{cell} = 3N_{ID}^{(1)} + N_{ID}^{(2)}, \quad (1)$$

where $N_{ID}^{(1)} \in \mathcal{N}_{ID}^{(1)}$ ($\mathcal{N}_{ID}^{(1)} = \{0, 1, \ldots, 167\}$) is the cell group ID and $N_{ID}^{(2)} \in \mathcal{N}_{ID}^{(2)}$ ($\mathcal{N}_{ID}^{(2)} = \{0, 1, 2\}$) the physical layer ID (sometimes called the sector ID) within a cell group according to 3GPP. The information on $N_{ID}^{(2)}$ and $N_{ID}^{(1)}$ are carried through two DL synchronization channels of an eNB, i.e. the Primary Synchronization CHannel (P-SCH) Signal (PSS) and Secondary Synchronization CHannel (S-SCH) Signal (SSS), respectively. For LTE FDD, the PSS is embedded in the last OFDM symbol and the SSS in the second last OFDM symbol, of the sub-frame 0 and 5 in each radio frame. For LTE TDD, the PSS is in the 3rd OFDM symbol of the sub-frame 1 and 6 and the SSS in the last OFDM symbol of the sub-frame 0 and 5. Once a UE successfully detects and decodes the PSS and SSS, the cell ID of the eNB can be determined.

The PSS is chosen from a class of the Zadoff-Chu (ZC) sequences defined as $$d_u(k) = e^{-j\frac{\pi u k(k+1)}{N_{ZC}}} \quad 0 \le k < N_{ZC}, \quad (2)$$

where $N_{ZC}$ is the ZC sequence length and u is the ZC root index relatively prime to $N_{ZC}$. The ZC sequence has a constant-amplitude zero autocorrelation (CAZAC). In LTE, $N_{ZC}=63$ is chosen for PSS in the frequency domain. $d_u(31)$ corresponds to the Direct Current (DC) subcarrier and is not transmitted. The three values $N_{ID}^{(2)}=0, 1, 2$ are represented by the PSSs with three different ZC root indices u=25, 29, 34, respectively, and decoding $N_{ID}^{(2)}$ means to determine u.

Let k=0 be the index of the DC subcarrier, the frequency domain SSS symbol of the cell m can be written as $$S_m(k) = \begin{cases} \pm 1 & k \in \mathcal{K} \\ 0 & \text{otherwise} \end{cases}, \quad (3)$$

where $\mathcal{K} := \{-K_1, \ldots, -1, 1, \ldots, K_1\}$ is the set of the subcarrier indices of SSS ($K_1=31$). Applying N-point IDFT, the corresponding time domain SSS can be obtained as $$s_m(n) = IDFT_N\{S_m(k)\} = \frac{1}{\sqrt{N}} \sum_{k=-K_1}^{K_1} S_m(k) e^{j\frac{2\pi nk}{N}}. \quad (4)$$

In the following the cell search in an example will be described. For example, multiple cells are searched for initial cell search (e.g., at call setup), and intra- and inter-frequency neighbor cell search for handover. In some examples the control module 14 is configured to determine a plurality of cell identification information using reception quality measures for a plurality of synchronization channels. Prior to the (especially initial) cell search, there might not be any information available (e.g. a mobile phone is switched on after arrival at an airport in some country) about the NetWork (NW) setup, IDs/timings/powers of cells around the UE, etc. In LTE, the cell ID $N_{ID}^{cell}$ can be detected in the following steps:

1) Locate and detect the multiple PSSs, and then decode their $N_{ID}^{(2)}$;
2) For each of the PSS position and $N_{ID}^{(2)}$, locate and detect possible overlapping SSSs and their corresponding $N_{ID}^{(1)}$;
3) Based on the results obtained in 1) and 2), select the most likely candidate cells.

Regarding the example illustrated in FIG. 1, the control module 14 may then be configured to detect the synchronization signal information according to a primary and a secondary synchronization channel broadcast by the cell 300.

In a general framework and practical implementation of some examples to realize step 1) in line with the 3GPP specifications a computational complexity of a neighbor cell search algorithm may be high. Some examples may use exploitation of the cross-correlation of the synchronization signals SSSs. Due to the poor cross-correlation between different SSS symbols, the performance of cell detection methods based on correlation of the received SSS symbol with noise-free copies of all SSS symbols may degrade, especially when multiple cells become time synchronized or quasi-synchronized. By properly considering the cross-correlation between the interfering cell and the cell to be detected as well as the signal power of the (strong) interfering cells, the impact of the interferer may be reduced or even suppressed in some examples. As shown the simulations, which are partly presented subsequently, this correlation-based interference suppression method may handle up to two strong interferers, and may work well for weak cells having an SINR down to about −10 dB.

Examples may be designed to mitigate (i.e. reduce, suppress or cancel) synchronization or other pilot signals from interfering cells during cell search. However, in practice when cells are not fully synchronized, which happens even for synchronous networks, the synchronization signal (such as the SSS symbols) may be interfered by control and/or user data from other interfering cells. Since these control and/or user data are usually unknown to the UE, they are more challenging to mitigate. Regarding the above example as illustrated in FIG. 1 the control module 14 may be configured to detect synchronization signal information by cancelling parts of the receive signal information based on the interfering signal information.

Some examples may reduce or cancel interference from other cells, irrespective whether the interference is a known pilot signal (such as the synchronization/sync signal), or unknown control or data, and irrespective whether the network is synchronous or not. The synchronization and other pilot signals of $N_2$ strong cells out of $N_1$ cells ($N_2 \le N_1$), which have been detected previously, may first be reduced/subtracted/cancelled from the received signal.

If the modulation scheme of the interfering data symbol is known or can be detected, say, by exploring the distribution of the constellations, the interfering symbols may be demodulated and cancelled/reduced. The remaining signal may be fed to a conventional cell searcher so that further target cells can be detected. In the following, $E\{\cdot\}$ is used to denote the expectation, $(\cdot)^*$ is used to denote the conjugate complex, $(\cdot)^T$ is used to denote the transpose, $(\cdot)^H$ is used to denote the conjugate transpose, and $Re\{\cdot\}$ is used to denote the real part of a complex number, respectively.

In the following an example for an LTE System will be described. The LTE system has a symbol period (time unit) TS=1/(15000×2048) sec and a subcarrier spacing of 15 kHz. The data signal is organized into 10 ms (radio) frames. Each frame consists of 2 half-frames or 10 sub-frames with a duration of 1 ms and each sub-frame consists of two equal-length slots.

Figure 2:
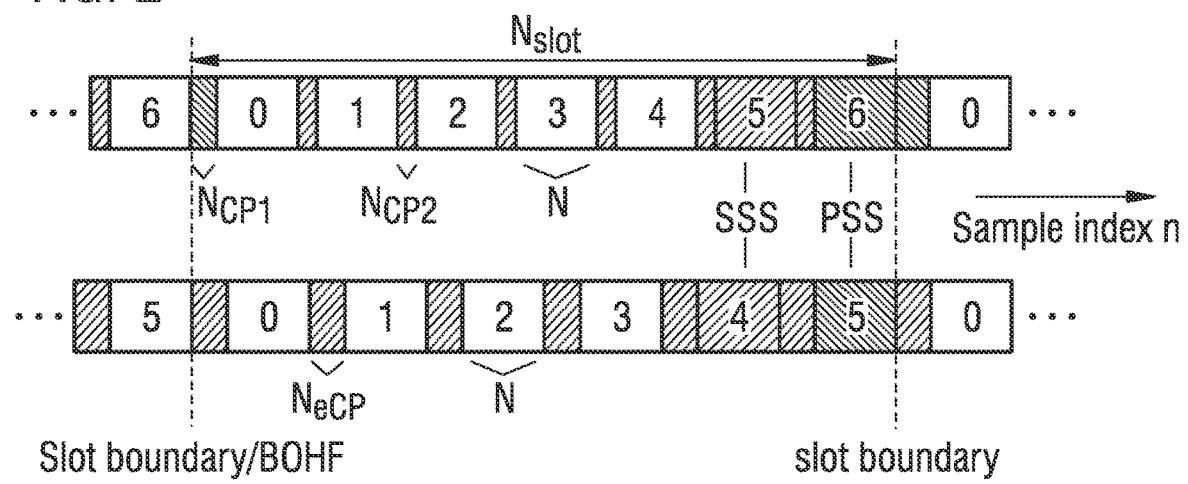
FIG. 2 shows an example of LTE (Long Term Evolution) FDD (Frequency Division Duplexing) OFDM (Orthogonal Frequency Division Multiplexing) symbols of slot 0 in a half-frame, where PSS (Primary Synchronization Signal) and SSS (Secondary Synchronization Signal) are embedded.

FIG. 2 shows two sequences of OFDM symbols, a sequence with 7 OFDM symbols and normal Cyclic Prefix (CP) per slot at the top, and a sequence with 5 OFDM symbols and extended CP at the bottom. A slot has a duration of $N_{slot}$ samples and the respective CP have a duration of $N_{CP1}$, $N_{CP2}$, $N_{eCP}$, where an OFDM symbol comprises N samples. As shown in FIG. 2, each slot consists of 7 symbols (in case of the normal cyclic prefix/CP), and thus each sub-frame has 14 symbols. The slot structure and CP length are different for normal CP and extended CP.

Figure 3:
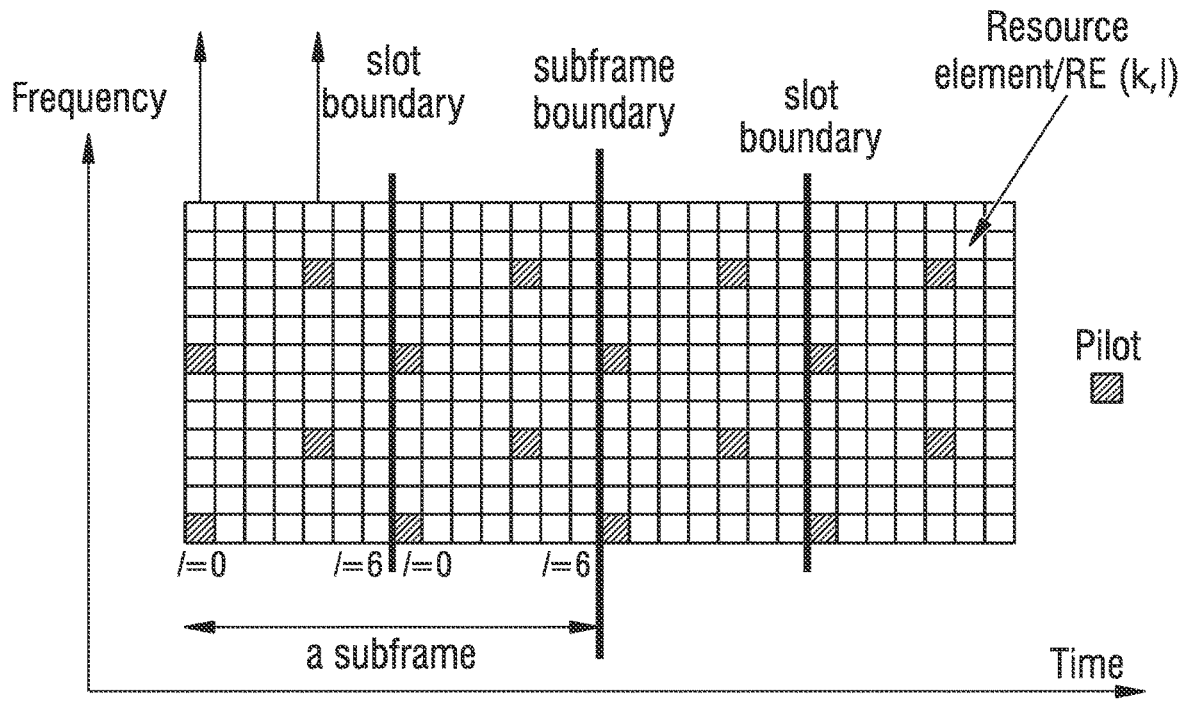
FIG. 3 illustrates a grid of Cell-specific Reference Signals (CRSs) in LTE DL for a single transmit (Tx) antenna in an example.

The mapping of data to subcarriers is done in frequency domain (see e.g. FIG. 3). The transmitted signal in one slot can be described as a 2D frequency-time matrix (grid) of $N \times L_{slot}$ resource elements (REs), where N is the FFT size and $L_{slot}$ the slot length. Out of all N subcarriers, only the central NSC subcarriers except DC are used to carry information. The other unused subcarriers are usually called the guard band. The Cell-Specific Reference signals (CRSs) are located in predefined positions. In the case of a single antenna port and within each pilot symbol, there is a reference RE every six subcarriers. In this study, a predefined signal, such as PSS, SSS or CRS is also referred to as a pilot (signal). FIG. 2 shows an example of LTE FDD OFDM symbols of slot 0 in a half-frame, where PSS and SSS are embedded (Δf=15 kHz, BOHF=Begin Of Half-Frame; top: normal Cyclic Prefix (CP); bottom: extended CP).

FIG. 3 illustrates a grid of Cell-specific Reference Signals (CRSs) in LTE DL for 1 transmit (Tx) antenna. FIG. 3 shows time on the abscissa and frequency on the ordinate. As can be seen the time axis can be subdivided in OFDM symbols, wherein 7 OFDM symbols make up a half-sub-frame (or slot) and two half-sub-frames (or slots) make up a sub-frame. In a similar manner the frequency axis is subdivided in subcarriers or REs, and one square element as shown in FIG. 3 is also referred to as Resource Elements (RE(k,l), with k as frequency index and l as time index). The pilot or reference symbols are indicated by the marked REs. The reference symbol spacing in time direction is indicated in FIG. 3 by the correspondingly labeled arrows.

Examples may enable cell search with interference cancellation. Consider a general environment, where the target (or victim) cell to be detected is "eclipsed" by a strong interfering (e.g. serving) cell. If the transmissions of the dominant interferer and the node of interest are time synchronized with each other, the transmission of PSS/SSS/PBCH from both nodes may be on top of each other. This may be considered a typical scenario encountered in synchronized LTE TDD and FDD networks. Specifically in LTE Rel. 11 FeICIC cells with an SINR lower than −11.2 dB should be detected. In the HetNet (Heterogeneous Network) to be supported in LTE Rel. 10+ and probably in future 5G,
the target cell can be interfered by a cell (e.g. a femtocell nearby) whose SINR is even 20 dB stronger than the signal from the target cell, which may render detection of the target cell more difficult.

In the following a system model for cell search will be detailed for an example. Suppose the set of the total number of cells is $N_T$. A target is to find within $N_T$ the set $N_M$ of, say, the M strongest cells surrounding the UE. The number of the cells is denoted in $N_T$ and $N_M$ as $|N_T|$ and $|N_M|$, respectively. Apparently, it holds $|N_M| \leq |N_T|$. For LTE $|N_T|=504$, where 504 is the total number of cells with distinct cell IDs defined for LTE. In case the UE knows that only a subset of 504 cells is to search, then $|N_T| \leq 504$ can hold.

A time synchronized OFDM system with a DFT size N and CP length G is assumed. Given the transmitted time domain SSS $s_m(n)$ from the m-th cell with a delay $\tau_m$ and an equivalent overall Channel Impulse Response (CIR) $h_m(l)$ (l=0, 1, ..., $L_m$−1, $L_m$=maximum channel delay spread), the UE received time domain SSS r(n) in an OFDM symbol, after removing CP, can be written as $$r(n) = \sum_{m \in N_T} \sum_{l=0}^{L_m-1} h_m(l) s_m(n - \tau_m - l) + z(n), \quad (5)$$

where z(n) is assumed to be a complex-valued zero-mean Additional White Gaussian Noise (AWGN) process. After N-point DFT, the corresponding received signal, i.e. the SSS symbol, in frequency domain becomes $$R(k) = \sum_{m \in N_T} H_m(k) S_m(k) e^{-j\frac{2\pi \tau_m k}{N}} + Z(k), \quad (6)$$

where $k \in K$ and $Z(k) \sim CN(0, \sigma_2^2)$. For one SSS symbol, K={−31, ..., −1, 1, ..., 31}, and the number of the considered subcarriers K:=|K|=62. R(k), $S_m(k)$, $H_m(k)$ and Z(k) are the N-point DFT of r(n), $s_m(n)$, $h_m(n)$ and z(n), respectively. Notice that (6) is valid for any input signal $S_m(k)$, such as PSS, and/or SSS, and/or CRS, control and/or data, etc.

In general, the cell search rule can be defined as follows: A cell $m \in N_M$ if $P_m \geq P_n$ for $\forall \ m \in N_M$ and $n \notin N_M$, where $P_m := E\{|H_m|^2\}$ is the UE received power from the cell m. In terms of 3GPP LTE, when the transmit signal is the CRS, $P_m$ is the so-called Reference Signal Received Power (RSRP), which is defined as the linear average over the power contribution of the resource elements that carry cell-specific reference signals.

In some examples, the control module 14 as shown in FIG. 1 is configured to determine the first cell 300 identification information for a cell for which a reception quality measure indicates a reception quality above a predetermined threshold. Such a threshold or quality measure may correspond to a reception power, a Signal-to-Noise-Ratio (SNR), an SINR, an RSRP, etc. When the transmit signal is the synchronization signal (PSS and SSS), Pm is called the Synchronization signal Received Power (SCH RP) as another example for the threshold or quality measure or metric, which is defined as the received linear average power of the resource elements that carry a synchronization signal. In other words, cell search based on synchronization signal is to find the M cells having the maximum SCH RP. In addition to RSRP, other metrics (measurements, quality measures, thresholds) like the RSRQ (Reference Signal Received Quality) are also used in LTE/LTE-A as criteria for cell identification (threshold), measurement and (re)selection. RSRQ is defined as the ratio of RSRP and RSSI (Received Signal Strength Indicator, another example for the threshold), where the RSSI is defined as the linear average of the total received power observed in OFDM symbols containing reference symbols.

Examples may use channel estimation of one or more radio channels between the apparatus 10 and the one or more cells or base station receivers 300, 310 cf. FIG. 1. The control module 14 of the apparatus 10 may be configured to estimate a radio channel information between a transmitter of the interfering signal and the first transceiver 100. The control module 14 may be configured to estimate the interfering signal information based on the radio channel information and modulation order information. For example, the control module 14 may be configured to estimate the radio channel information between the transmitter of the interfering signal and the first transceiver 100 based on one or more reference symbols comprised in the interfering signal. The control module 14 may be configured to estimate multiple radio channel information between multiple antenna ports of the transmitter of the interfering signal and the first transceiver 100 based different symbols comprised in the interfering signal.

It can be assumed that the delays $\tau_m$ have been estimated, say using PSS signal and the Maximum Likelihood (ML) criterion. Now consider the case $|N_E|=2$ cells, (6) can then be written as $$R(k) = H_0(k)S_0(k)e^{-j\frac{2\pi\tau_0 k}{N}} + H_1(k)S_1(k)e^{-j\frac{2\pi\tau_1 k}{N}} + Z(k). \quad (7)$$

To simplify the analysis, a flat-fading channel can be considered here and it is assumed that the channel remains roughly invariant within the considered subcarriers. Define $S'_m(k):=$ $$S_m(k)e^{-j\frac{2\pi\tau_m k}{N}},$$

and omit the subcarrier index k when no confusion occurs. Then, it results $$R(k)=H_0 S'_0(k)+H_1 S'_1(k)+Z(k) \quad (8)$$

Assume that cell 1 is the target cell to detect, and cell 0 is the interfering cell. By taking statistical averaging for the channel and noise, and using the fact that the channel $H_0$, $H_1$ and noise Z are statistically uncorrelated and have zero mean, and for simplicity it can be considered $|S'_m(k)|=1$ (e.g. as in the case of LTE PSS, SSS, or CRS), thus $$P_R = P_0 + P_1 + \sigma_Z^2, \quad (9)$$

where $P_R:=E\{|R|^2\}$ is the received signal power, $P_0:=E\{|H_0|^2\}$, $P_1:=E\{|H_1|^2\}$ and $\sigma_Z^2:=E\{|Z|^2\}$ are the power of the signal of cell 0, cell 1 and noise, respectively.

Then, we obtain the SINR of cell 1 can be obtained as $SINR_1=P_1/(P_0+\sigma_Z^2)$. Usually, the SINR of a signal determines the detectability of this signal. For a strong interferer $P_0$, $SINR_1$ will be small so that cell 1 becomes difficult to detect. However, when the signal of the interferer cell 0, i.e. $H_0 S'_0$, can be cancelled, then cell 1 has a much greater $SINR_1=P_1/\sigma_Z^2$ under which the cell 1 becomes more easily detectable. As a numeric example, assume the received signal of cell 0 and 1 have the SNR, $SNR_0=P_0/\sigma_Z^2=20$ dB, $SNR_1=P_1/\sigma_Z^2=0$ dB, respectively, then for cell 1, $SINR_1\approx-20$ dB without interference cancellation, and $SINR_1=0$ dB with interference cancellation. Note that a signal with an SINR of −20 dB may not be detectable whereas a signal with an SINR of 0 dB may become easily detectable.

Figure 4:
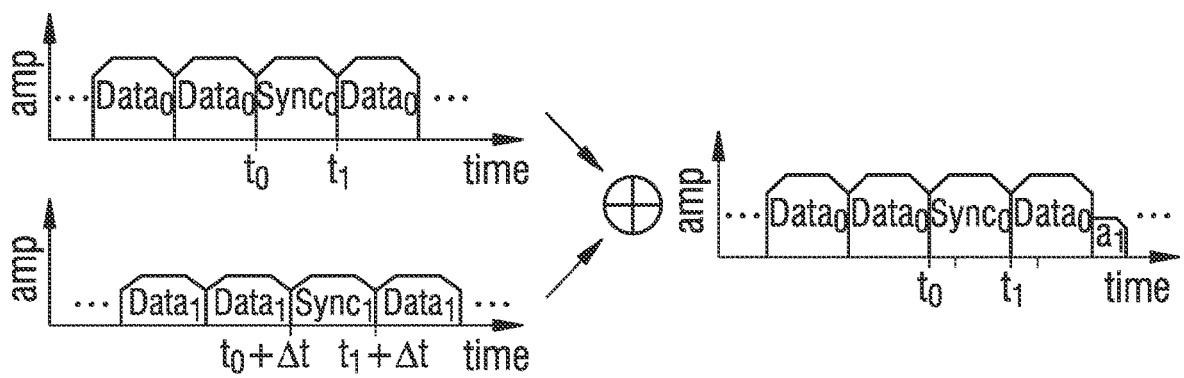
FIG. 4 illustrates time lines of a serving cell signal and one interfering signal in an example.

In order to cancel or reduce the interfering signal $H_0 S'_0$, i.e. subtract $H_0 S'_0$, in (8), it is necessary to estimate the channel $H_0$ of the interference. Depending on whether the synchronization symbol of the target cell is interfered by pilot signal and/or unknown data or control symbol from an interfering cell, there are different scenarios, some of which are depicted by FIG. 4. FIG. 4 illustrates examples of time lines of one interfering signal of cell 0 ($Data_0$ and $Sync_0$), (these are usually considered as two parts of one interfering signal) at the top and cell 1 ($Data_1$ and $Sync_1$) at the bottom of the left hand side. As shown in the center of FIG. 4 these signals may add up to the receive signal shown on the right hand side, in which the respective signals superimpose. FIG. 4 shows an example scenario for estimating the channel of the interfering cell. FIG. 4 may be considered a typical synchronous or asynchronous network in terms of "amp" (amplitude) vs. "time", where "$Sync_0$"/"$Sync_1$" and "$Data_0$"/"$Data_1$" are the synchronization and data symbols from the interfering/target cell, respectively. The "$Sync_1$" of the target weak cell can be hidden/interfered by:

a) "$Sync_0$" (for fully synchronous network, e.g. $\Delta t=0$);
b) "$Data_0$" (for asynchronous network, e.g. $\Delta t > t_1 - t_0 > 0$) or;
c) both "$Sync_0$" and "$Data_0$" (for partially synchronous network, e.g. $0 < \Delta t < t_1 - t_0$) from the interfering cell.

In case the interference is pilot signal a typical case may be assumed, for which target and interfering cells are fully synchronized, where the synchronization symbol of the target cell is colliding with and interfered by the synchronization symbol of the interfering cell. The channel of the interference $S_0$ can be estimated by using the synchronization signal SSS. With the Least Square (LS) algorithm applied to the SSS $S_0$, $H_0$ can then be estimated as $$\hat{H}_{0,LS}(k)=R(k)/S_0(k). \quad (10)$$

In some examples, a Wiener filter may be used on the obtained LS channel estimate $\hat{H}_{0,LS}$ to obtain the MMSE (Minimum Mean Square Error) channel estimate, say $\hat{H}_0$. Sometimes the Wiener filter can be approximated as a smooth filter, e.g. with several taps. Notice that the channel estimate $\hat{H}_0$ has also included the phase rotation caused by the delay $\tau_0$. When properly choosing the starting point of the FFT window, $\tau_0=0$ may result. As PSS and SSS symbols are closely located in LTE FDD/TDD, their channels can be considered as approximately the same. The channel estimate of SSS can be used for PSS, and vice versa. As such, the interfering PSS and SSS can be cancelled.

In case the interference is unknown data a typical case may be assumed, when the synchronization symbols are not colliding with each other, such as in the case of asynchronous networks. In this case, the channel of the interference $S_0$ may be estimated using the known CRSs of the interfering cell embedded in the time-frequency grid of data. Then for MMSE channel estimation, a Wiener filter may be employed. In case the interference is pilot and data as shown in FIG. 4, a more general case may be assumed, when the target and interfering cells are partially synchronized. There are two parts of interference from two consecutive OFDM symbols, the synchronization symbol part and the data part. As shown above, for the synchronization symbol part, its channel can be estimated using the synchronization signal itself, whereas for the data part, its channel can be estimated using the embedded CRSs. Notice that in an LTE system, the synchronization signal and the control signal/user data are usually transmitted in different antenna ports, meaning their channels are different from each other.

Figure 5:
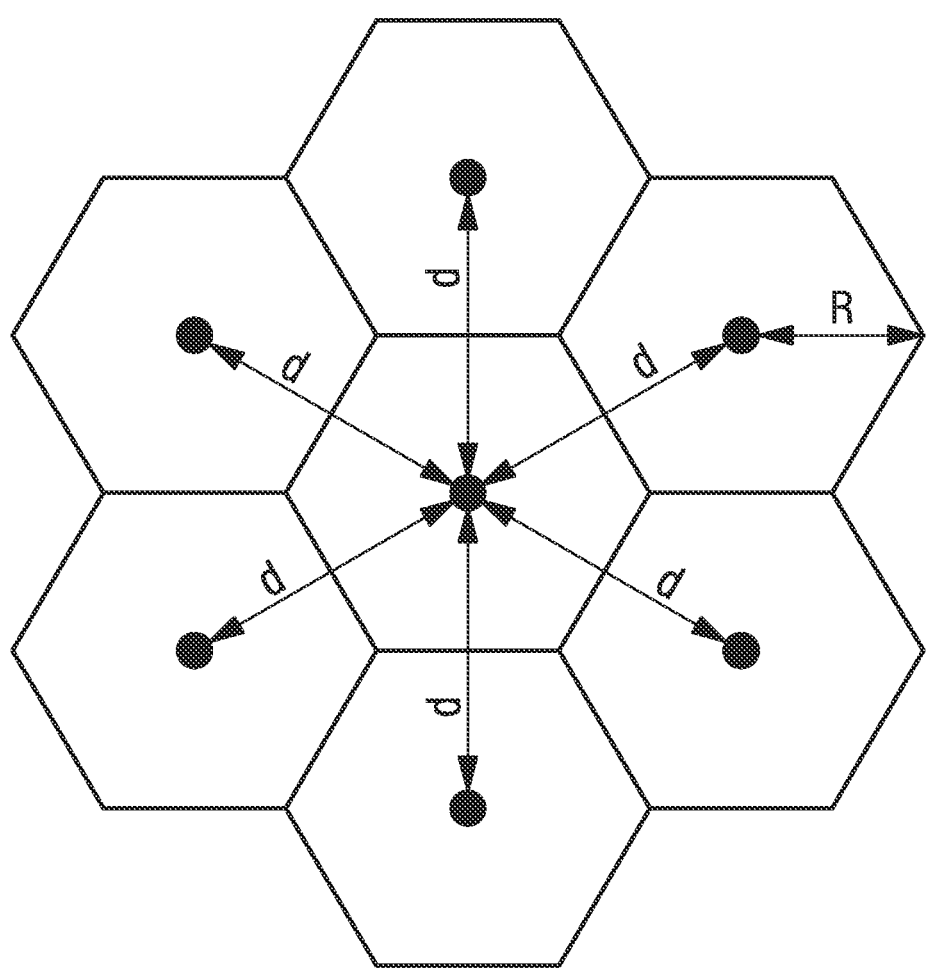
FIG. 5 shows a conventional cellular network structure in an example.

FIG. 5 shows a typical cellular network structure in an example, in which base stations are assumed in the centers of equidistant, hexagonal cells (d=distance between cells or eNBs, and R being the radius of a cell). Synchronous NW and asynchronous NW may have different impacts. The synchronous NW may be a NW scenario considered for LTE Rel. 11 and 12 small cells and Network-Assisted Interference Cancellation and Suppression (NAICS). In practice, it may be considered difficult to fully synchronize the cells due to different distances from a UE to different eNBs, different propagation channels, etc. As shown in FIG. 5, an LTE system can have a cell size d/2=100 km. Assume a UE is located in the middle of the local (center) cell. Then, the line of sight (LOS) delay difference τ at UE between the local and the next neighbor eNBs τ=d/c=667 μs≥0.5 ms (=duration of 1 slot, c=radio propagation speed). In other words, even in a synchronous NW, the signals from different cells arriving to a UE can have a timing offset of about 0.5 ms, which corresponds to 7 OFDM symbols in LTE.

Even for cells with d/2=3 km, still τ=d/c=20 μs, which roughly corresponds to the duration of ⅓ of an OFDM symbol. Obviously, the timing offset can become even larger by considering the multipath and the oscillator error between eNBs. As can be seen, the difference between the synchronous and asynchronous LTE NW is the timing offset between signals of different cells, which can normally be within 0.5 ms in the synchronous NW and up to 10 ms in the asynchronous NW. In such cases, the synchronization symbol of a target cell may not collide with the synchronization symbol of another cell, but may likely be interfered (at least partially) by unknown data. This may be considered a bottleneck scenario where the performances of the cell search are limited. To deal with this problem, examples may blindly detect the modulation order of the interfering data so that it can be cancelled thereafter, irrespective whether the NW is synchronous or asynchronous. Regarding the example depicted in FIG. 1 the control module 14 may be configured to estimate the interfering signal information using blind detection. In some examples the control module 14 may be configured to determine a modulation order information of an interfering symbol within the interfering signal before estimating the interfering signal information.

In some examples, when the interfering signal in the received signal is known or can be correctly estimated, it can be cancelled or reduced, e.g. subtracted from the received signal. Cancellation of interference, especially the strong interference, may lead to a residual signal having a much higher SINR. This in turn may make the weak target signal in the residual signal easily detectable. Assuming that the transmit data, say $S'_0$, has been demodulated and the channel of the interferer is estimated with an adequate accuracy, $\hat{H}_0 \approx H_0$ can be assumed. Then after subtracting $H_0 S'_0$ in (8), the residual signal may be obtained as $$R'(k) := R(k) - \hat{H}_0 S'_0(k) \approx H_1 S'_1(k) + Z(k). \quad (11)$$

The accuracy of the estimated interference channel may be considered vital for the applicability of the interference cancellation. Fortunately, in some applications, the interfering signals stem from strong cells (e.g. detected in previous runs), and hence, their channels can usually be accurately enough estimated such that the interference cancellation can work properly.

Figure 6:
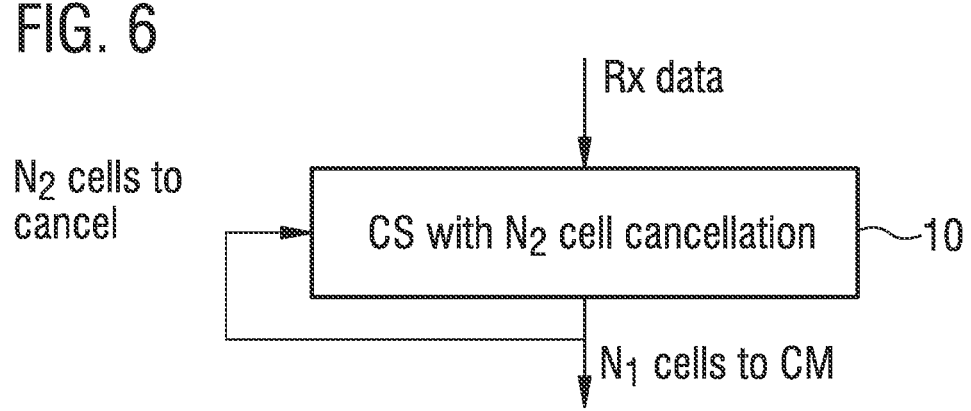
FIG. 6 shows an example using successive interference cancellation.

Examples may follow a general procedure for interference cancellation based cell search. A typical procedure of the cell search with successive interference cancellation (SIC) is provided in the example depicted in FIG. 6. FIG. 6 shows another example of the apparatus 10 as detailed in FIG. 1. The receive (Rx) signal corresponds to the Rx data as provided from the top. The apparatus 10 then performs Cell Search (CS) and uses interference cancellation for $N_2$ cells. FIG. 6 illustrates a procedure of the example of an IC cell searcher for LTE/LTE-A (CS=Cell Search; CM=Cell Measurement).

The apparatus 10 is initialized with $N_2$=0. Examples may then carry out the following procedure:
1) Cell search with SIC: Apply a CS (cell searcher, e.g. a PSS-SSS searcher) for the residual signal in which $N_2$ pilot symbols and data symbols (when possible) from the (strongest) cells are canceled, resulting in a total of $N_1$ cells sent to CM (=Cell Measurement) for RSRP/RSRQ measurement,
2) Determine the cells to cancel: Among the $N_1$ cells, determine $N_2 < N_1$ cells to be cancelled in next run,
3) If all target cells with detectable power (or enough cells) with the current input data have been detected, or enough iterations are reached, take the next received signal as input data, and
4) Go to 2) for next run.

In some examples the strongest $N_2$ cells detected previously may be cancelled. However, other specific $N_2$ cells (not necessarily the strongest) can also be cancelled when needed in other examples. To determine the $N_2$ cells, one can e.g. use the results of the previous cell measurement, such as choosing the $N_2$ cells with the greatest RSRP/RSRQ values. The channels of some of the $N_2$ cells can be estimated successively (sequentially), or in parallel, or jointly. The corresponding cells can then be cancelled successively or in parallel.

Figure 7:
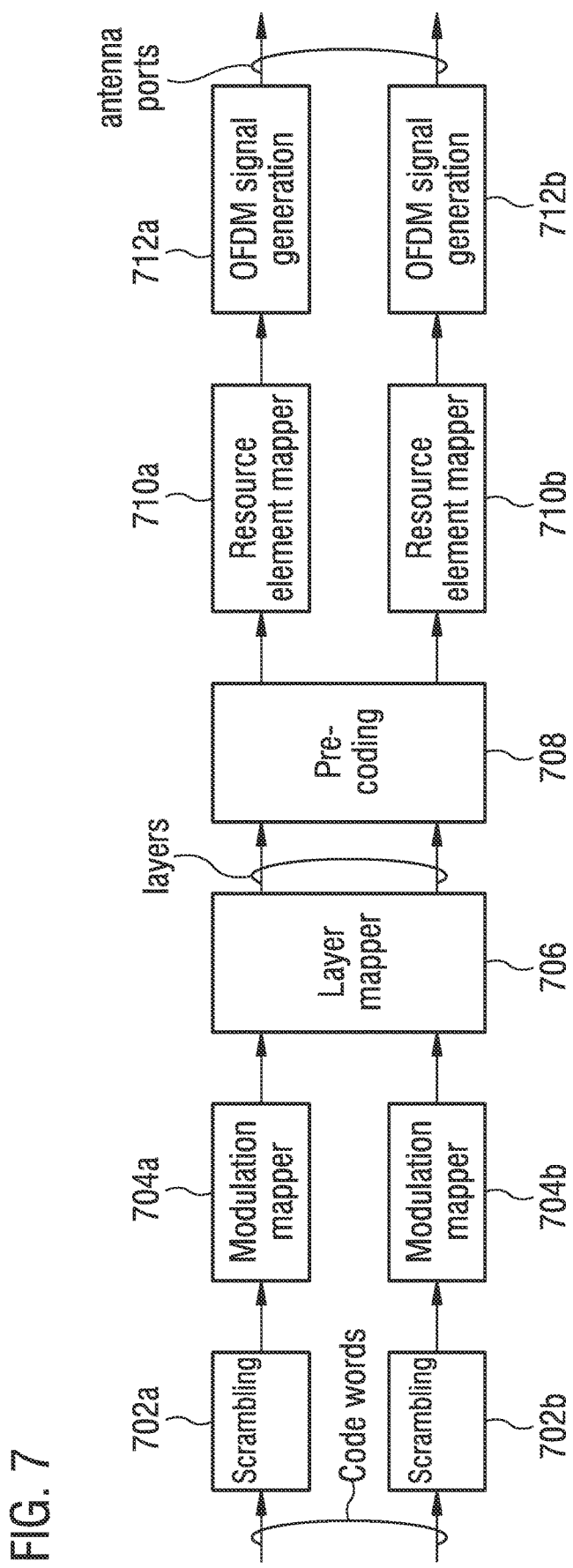
FIG. 7 shows an example of a processing chain used at a transmitter.

In examples, determining the timing and cell IDs of the relatively strong cells may be done based on the synchronization signal. Once the timings and the cell IDs of the strong interfering cells are detected, the frame structure of each interferer is known. Contrary to other pilot signal and control/user data, the synchronization signal does not go through physical channel processing steps, such as scrambling, modulation mapper, layer mapper and precoding, as shown in FIG. 7. FIG. 7 shows an example of a processing chain used at a transmitter for data and/or control signals. FIG. 7 shows two scrambling units 702a and 702b configured to scramble two codewords and configured to provide two scrambled codewords to two modulation mappers 704a and 704 b. The modulation mappers 704a and 704b are configured to map the scrambled codewords to modulation symbols, which are then provided to a layer mapper 706. The layer mapper 706 is configured to map the modulation symbols to a number of spatial layers supported by the transmission and the symbols of the layer are then provided to a precoder 708. The precoder 708 is configured to precode the layer symbol to obtain precoded transmit symbols. The precoded transmit symbols are the provided to resource element mappers 710a and 710b, which are configured to map the precoded transmit symbols to corresponding resource elements. In the example depicted in FIG. 7 there are two layers and accordingly there are two transmission paths and it is further assumed that these are correspondingly provided to two antenna ports. The resource elements are provided to two OFDM signal generators 712a and 712b, which are configured to generate the OFDM signals to be transmitted on the two subsequent antenna ports. In other examples there may be only one branch (one codeword, one layer, one antenna port, etc.) or even more than two branches, e.g. more than two codewords, layer, antenna ports, combinations thereof, respectively.

Therefore, the synchronization signals of strong interferers, which are known, say from the previous cell search process, can directly be cancelled or reduced. However, to be able to cancel the other pilot signal and control/user data from the interfering cells, especially when they are interfering the synchronization symbol of the target cell, inverse physical channel processing for the interferer may be carried out in some examples. Specifically, this may include, according to FIG. 7, inverse precoding, inverse layer mapping, and/or inverse modulation mapping. With respect to the example shown in FIG. 1, the control module 14 may be configured to estimate precoding information, a layer mapping and/or a modulation mapping, applied to the interfering signal and to detect the synchronization signal information further based on the estimated precoding, layer mapping, and/or modulation mapping.

In some examples a UE may know the precoding, layer mapping, and the modulation order of the interferer. Blind detection of the precoding, layer mapping, and the modulation order of a strong interferer may in general be feasible in some examples, other examples may use network assisted concepts as will be detailed subsequently. In the sequel a simple method for the LTE modulation scheme detection will be presented. First, some NW configurations to ease/simplify the detection of the precoding and layer mapping are discussed.

Demodulation of the interfering data symbols based on the (detected) modulation order (e.g. Quaternary Phase Shift Keying (QPSK), 16 Quadrature Amplitude Modulation (QAM), or 64QAM) may be done in some examples, e.g. based on the ML criterion, or by selecting the transmit symbol which is the closest to $R(k)/\hat{H}_0$ on the constellation. The modulation order can, e.g. be pre-detected based on the available statistics, when it does not change for a time period in some examples.

To effectively cancel the interference, examples may determine or estimate:
1) the channel between the transmitter and the receiver; and
2) the modulation order of the transmit signal.

In some examples, 1) and 2) are side information determined or obtained for data or control demodulation in the modern communication systems like 2G, 3G or 4G systems. For optimal demodulation/detection performances, the ML criterion may be employed in some examples. Recall that ML detection may aim to determine the most likely (closest) transmitted signal point given a discrete set of candidate constellations (=modulation order). Without modulation order, there might not be a candidate set, and consequently no detection may be possible in some examples. On the other hand, with the modulation order available, the candidate set is available, and consequently the ML detection may guarantee a solution. Thus, in the sense of the ML detection, the modulation order may be considered necessary and sufficient side information.

When not only the modulation order but also the transmit signal itself is known, no blind detection of the interference may be needed, which in general may lead to better interference cancellation performance. This is, e.g. the case when the interference is the synchronization signal PSS/SSS as in the case of the fully synchronous networks. As already mentioned above, some examples may use blind modulation order detection. As an example, an LTE/LTE-A downlink (DL) is considered in the following. The LTE/LTE-A uplink (UL) can be handled similarly. In the current LTE/LTE-A DL, except several reference signals such as the PSS or SSS as described above, other signals have fixed constellation at each Resource Element (RE). The CRS, PRS (Positioning Reference Signal), and the signal in the physical control or broadcast channels (PBCH/Physical Broadcast CHannel, PCFICH/Physical Control Format Indicator CHannel, PDCCH/Physical Downlink Control CHannel, PHICH/Physical Hybrid-ARQ Indicator CHannel, etc.) use the modulation QPSK, whereas the Physical Data CHannel (PDSCH/Physical Downlink Shared CHannel, PMCH/Physical Multicast CHannel) have the modulation QPSK, 16QAM, or 64QAM.

Figure 8:
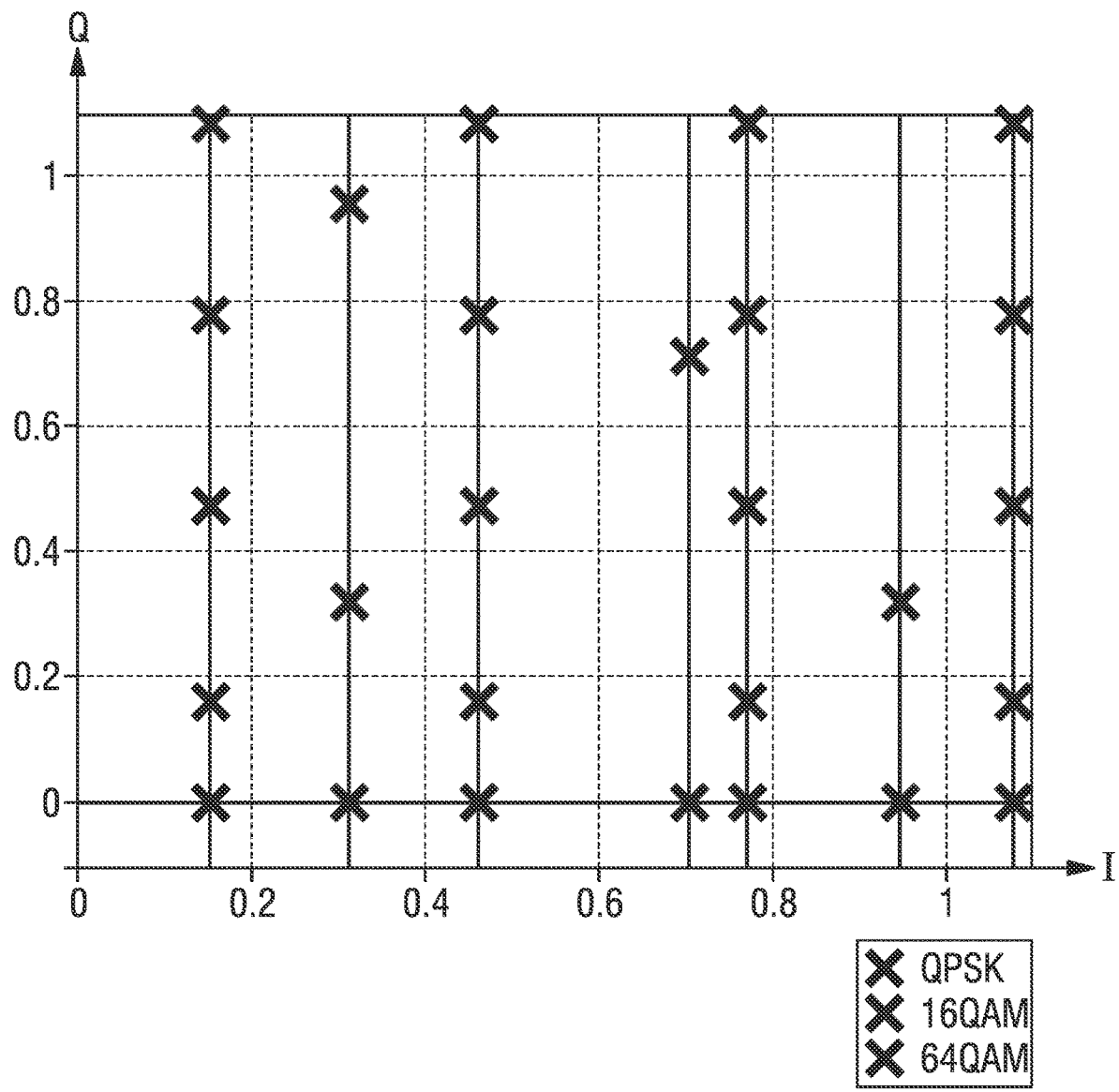
FIG. 8 illustrates a projection of the modulation symbols of QPSK, 16QAM and 64QAM onto the I/Q-plane in an example.

In the following example, a modulation scheme detection when no precoding is applied or precoding is known is considered, such as in the LTE transmission modes 1 or 2, where the bit stream has a unique mapping onto the complex-valued QPSK, 16QAM or 64QAM symbols. More general complex scenarios and examples are considered subsequently. Some examples may use techniques used in artificial intelligence to determine or estimate the modulation scheme. Some examples may use a very simple method for LTE. For example, the received complex-valued data (after inverse precoding) are projected into a one-dimensional line which can be either x- and/or y-axis of the constellation. Only absolute values of the projection may be considered, as QPSK and QAM are symmetric to I-(Inphase) and Q (Quadrature)-axis of a complex plane. When no noise is available, there is 1 point on the projection line (I- or Q-axis) for QPSK, 2 points for 16QAM, and 4 points for 64QAM, where x-axis is the I-axis and y-axis the Q-axis. FIG. 8 illustrates a projection of the modulation symbols of QPSK, 16QAM and 64QAM onto the I/Q-plane. In the example, illustrated by FIG. 8, the data sample magnitude is grouped or quantized and then projected onto the I- and Q-axis into 6 regions (bins): [0 0.2), [0.2 0.4), [0.4 0.6), [0.6 0.8), [0.8 1), and [1+∞). The numbers of samples within the 6 bins are then counted, and denoted, say, as $n_1$, $n_2$, $n_3$, $n_4$, $n_5$ and $n_6$.

Figure 9:
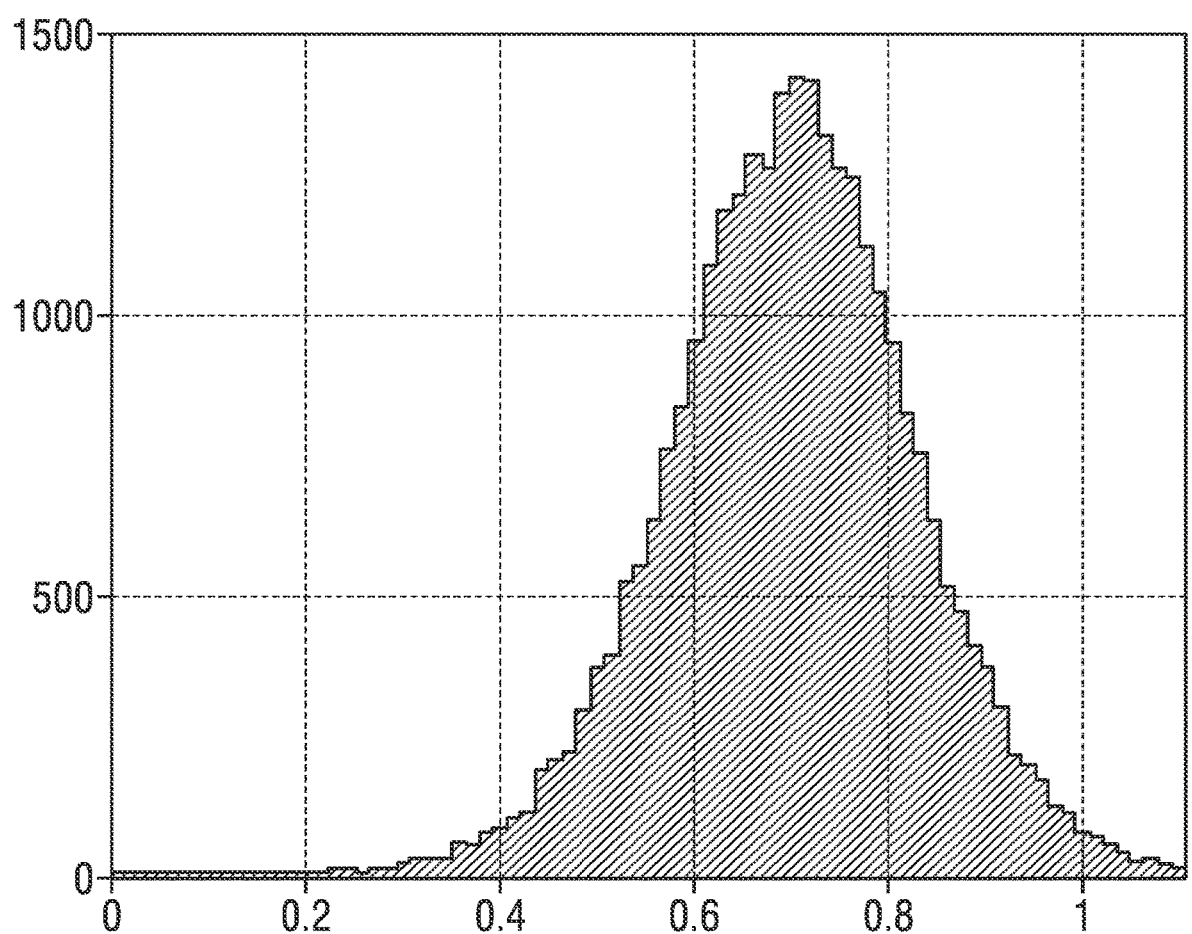
FIG. 9 shows a typical histogram of QPSK data (under AWGN at SNR=15 dB) mapped onto I-axis in an example.
Figure 10:
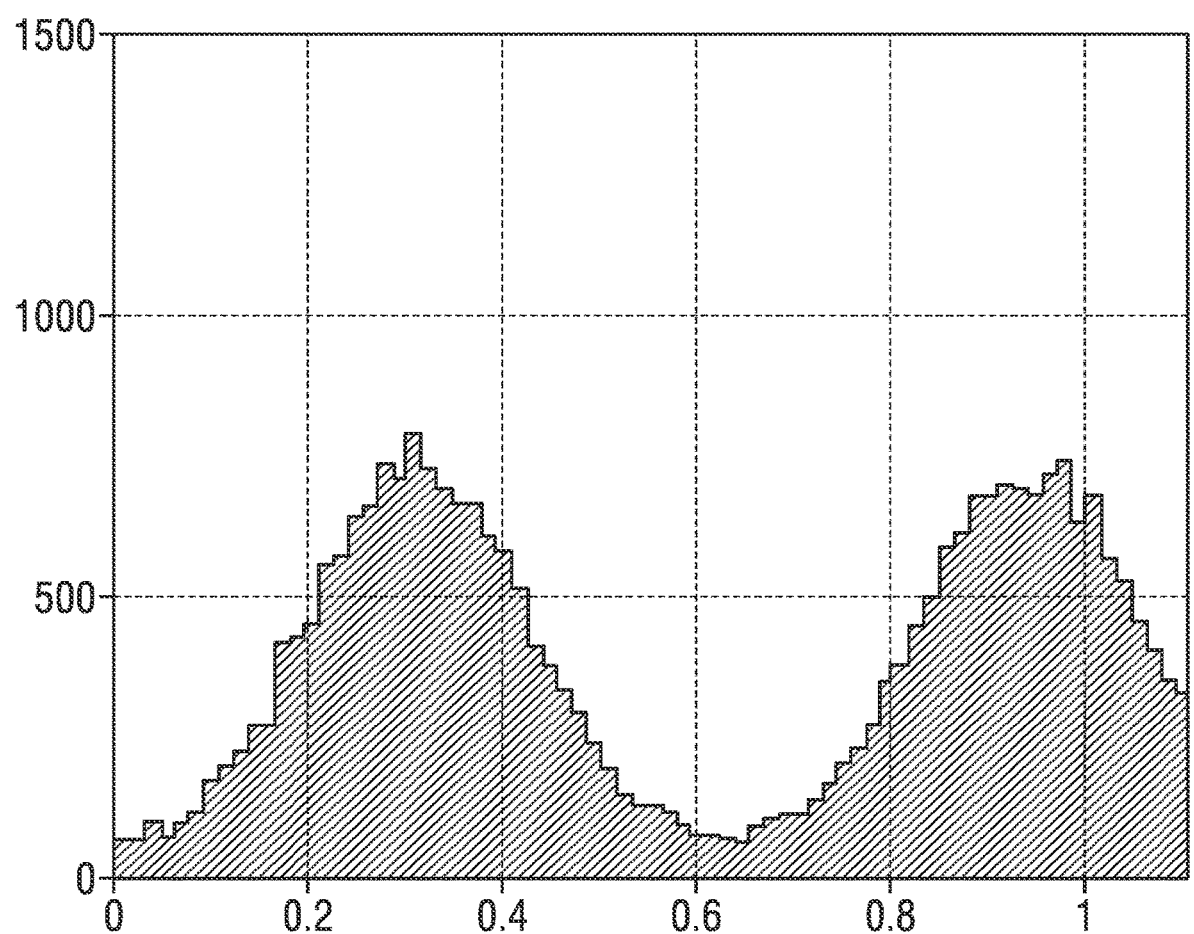
FIG. 10 shows a typical histogram of 16QAM data (under AWGN at SNR=15 dB) mapped onto I-axis in an example.
Figure 11:
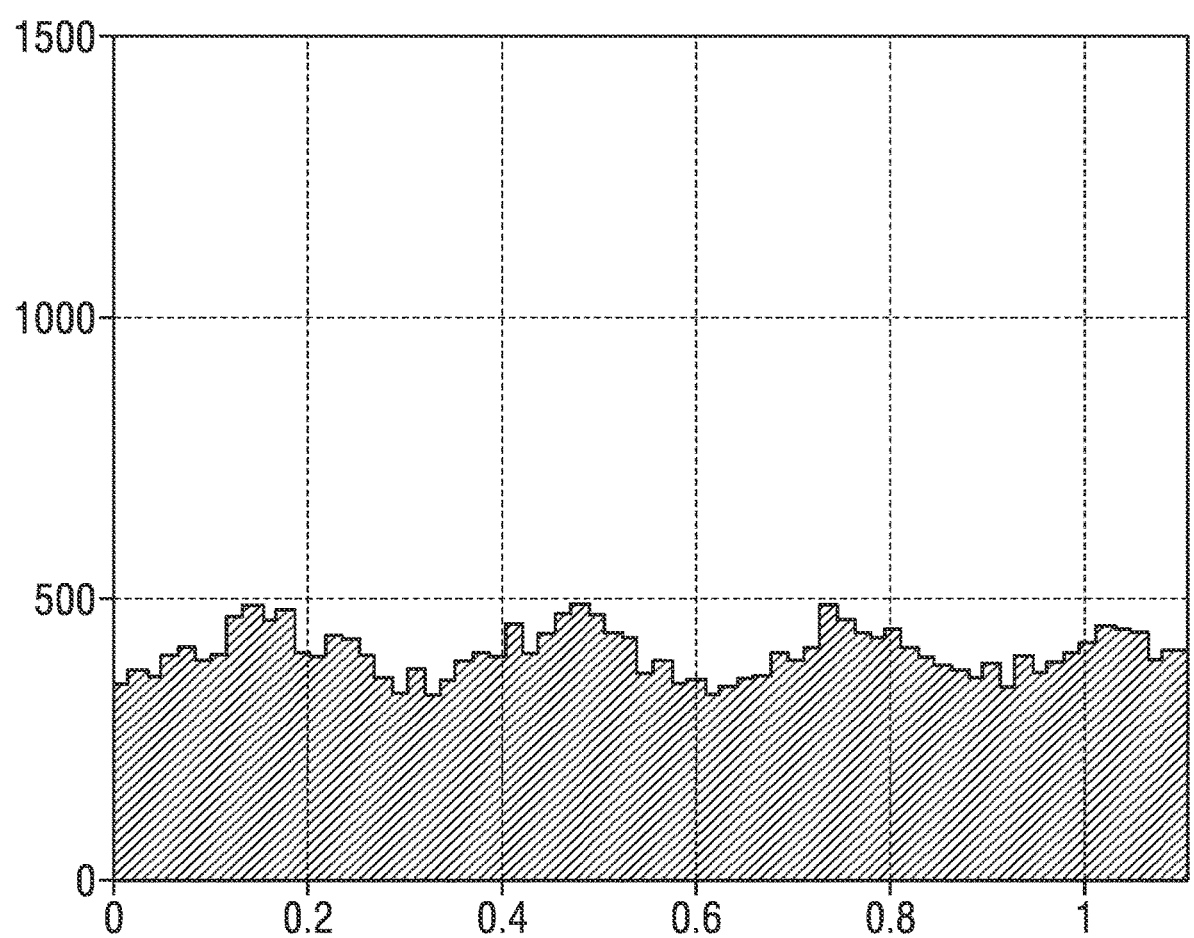
FIG. 11 show a typical histogram of 64QAM data (under AWGN at SNR=15 dB) mapped onto I-axis in an example.

FIG. 9 shows a typical histogram of QPSK data (under AWGN at SNR=15 dB) mapped onto I-axis in an example. FIG. 10 shows a typical histogram of 16QAM data (under AWGN at SNR=15 dB) mapped onto I-axis in an example. FIG. 11 show a typical histogram of 64QAM data (under AWGN at SNR=15 dB) mapped onto I-axis in an example. According to FIGS. 9-11, it is clear that for QPSK, the data samples are concentrated in bin 4, whereas for 16QAM, they are mainly located in the bin 2, 5 and 6. Based on the sample distributions, a simple detection rule for some examples can be formulated as follows:
a) If $k_4 n_4 > n_1 + n_3$, $k_4$=weighting factor (e.g. $k_4$=0.8), the modulation order is detected as QPSK;
b) Otherwise if $n_2 + n_5 + n_6 > n_1 + n_3 + n_4$, the modulation order is detected as 16QAM; and
c) Otherwise it is detected as 64QAM.

Although very simple, this detection rule works quite well for a quick detection of the modulation order. It can easily be extended to cover further modulation schemes like Binary Phase Shift Keying (BPSK) and/or 256QAM. More advanced detection rules can be developed in further examples, e.g. by minimizing certain detection error metrics for given sample distributions.

From FIG. 8 it can be seen that QPSK data are within bin 4 and are close to the representative value of 64QAM within the bin 4. Furthermore, as 64QAM constellation has more representative values than QPSK and 16QAM, a data sample may be classified to belong to 64QAM without making bigger errors, in case it cannot be ensured that the data belongs to QPSK or 16QAM. On the other hand, when the actual modulation scheme is 64QAM, it should be avoided to be classified as QPSK or 16QAM when not sure. With this strategy, better overall performances for cell search can be obtained.

Simulations show that with a very high error rate (say, >50%) in modulation order detection, good cell detection results can still be obtained. In the following simulation results will be presented for a 2-cell scenario under both AWGN and Extended Typical Urban (ETU) 70 channel conditions. The LTE system had the transmission mode (TM) 2, i.e. transmit diversity with a fixed precoding. The eNBs had each 2 transmit antennas, and the UE had 2 Rx antennas. The target cell and interfering cell at the UE had a timing offset of 2 OFDM symbols. Prior to the blind modulation order detection, inverse precoding was first conducted, as the precoding matrix for TM2 is unique. Then, the proposed simple modulation order detection algorithm was employed. Data is demodulated based on the assumption of transmission diversity. The demodulated data is accumulated e.g. over five sub-frames. For cell search, the performance is given in terms of the in-set rate, which is defined as the rate of a cell belonging to the 15 strongest cells provided to RSRP measurement. The simulation setting used 2 base stations, one target cell (cellId: 109) plus one interfering cell (cellId: 112), channel condition is ETU70, 2×2 MIMO, and a-synchronized with offset=2 of dm sym length.

Figure 12:
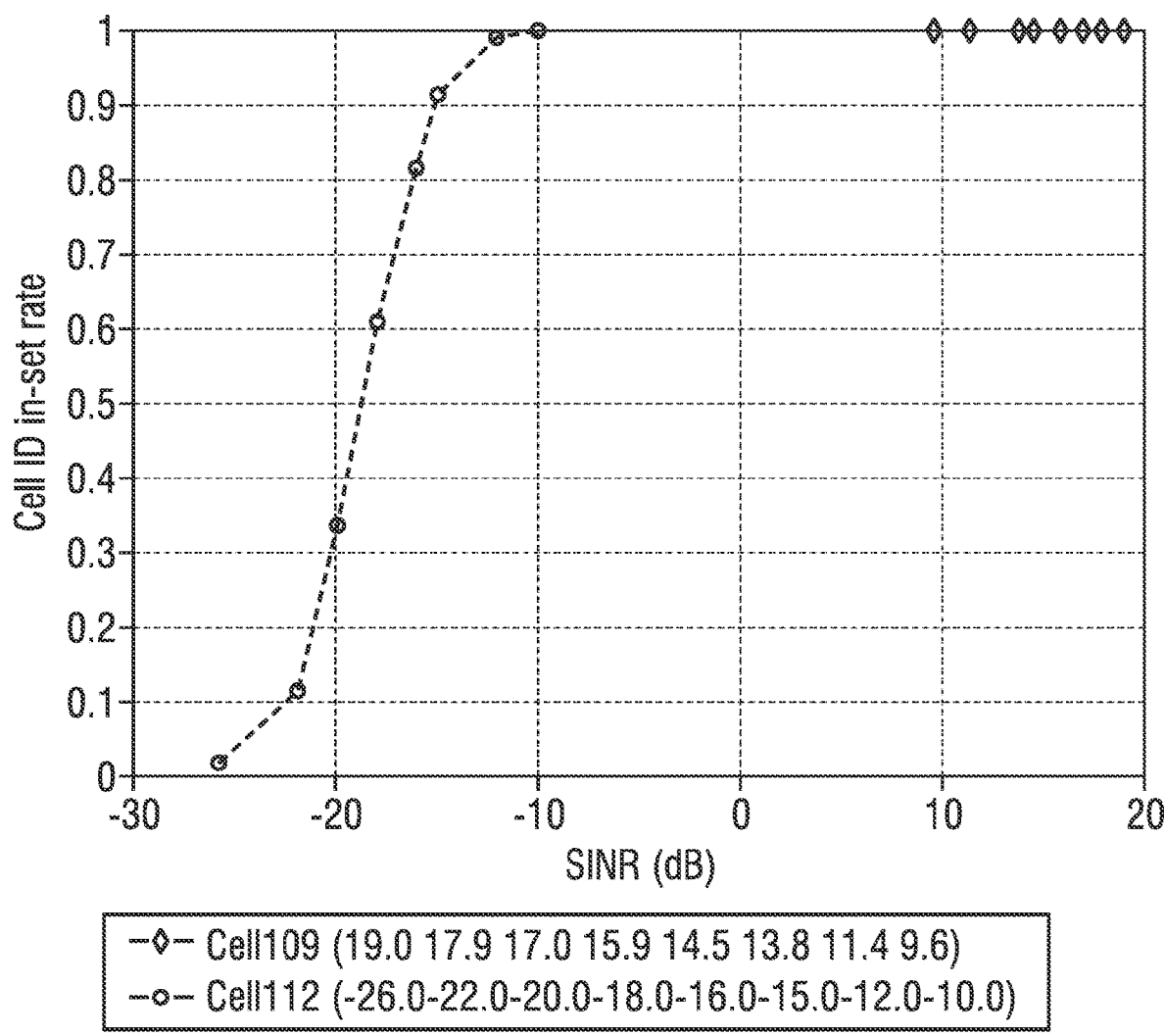
FIG. 12 illustrates simulation results for an example showing a cell search in-set rate, when QPSK is wrongly detected as 16QAM under ETU 70 channel.
Figure 13:
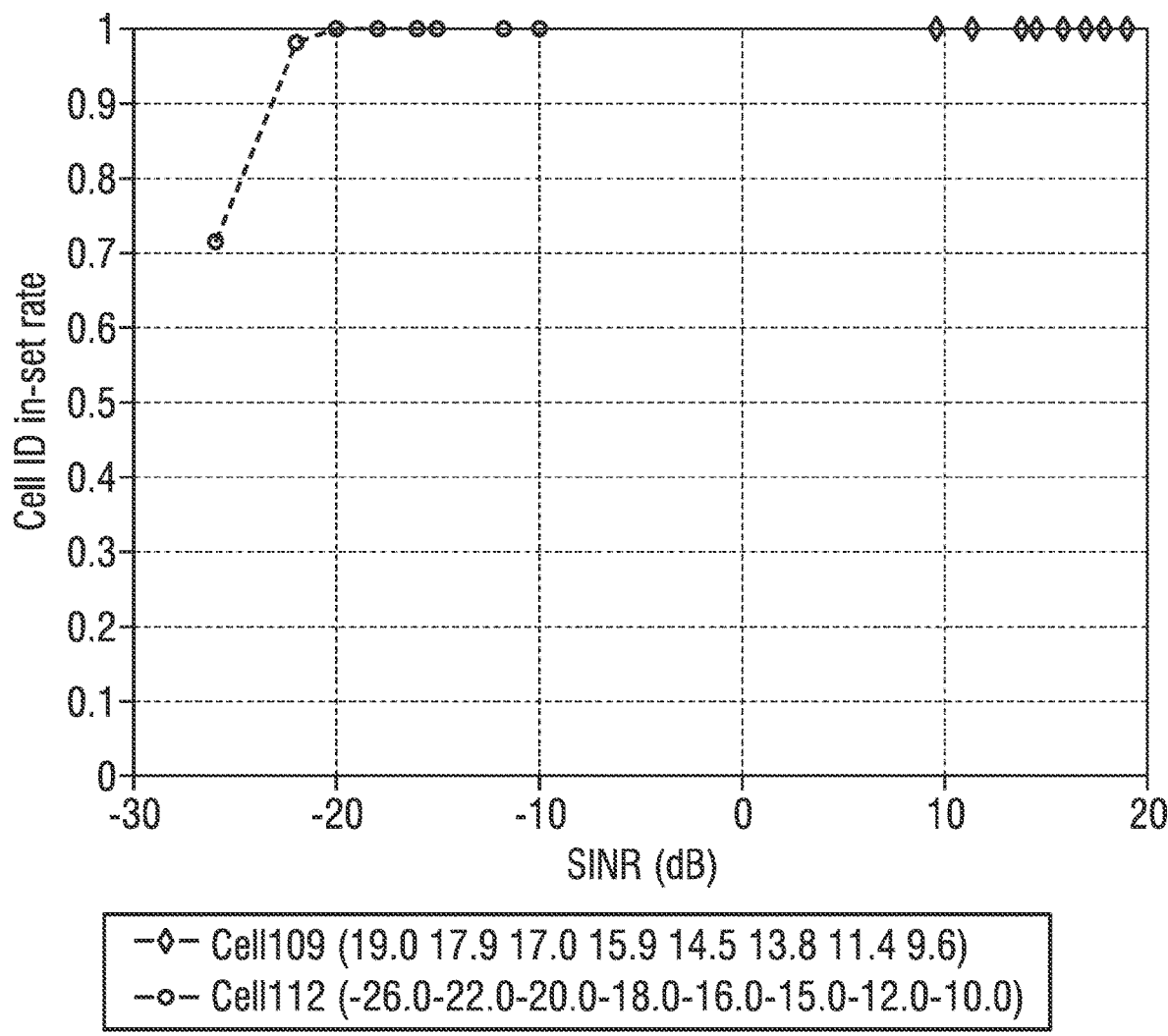
FIG. 13 illustrates simulation results for an example showing a cell search in-set rate, when 16QAM is ideally detected as 16QAM under ETU70 channel.
Figure 14:
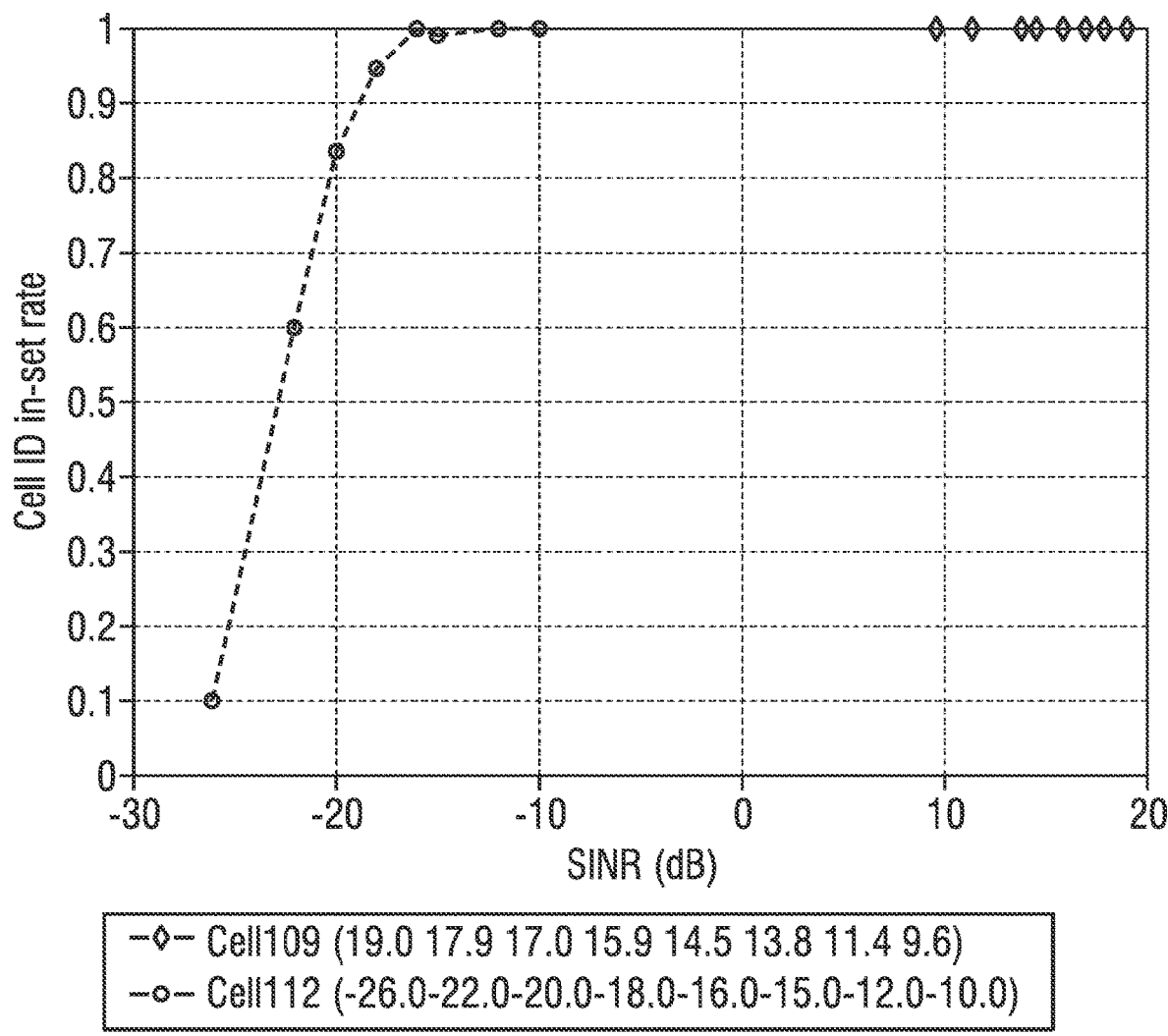
FIG. 14 illustrates simulation results for an example showing a cell search in-set rate when 64QAM is wrongly detected as 16QAM under ETU70 channel.

FIG. 12 illustrates simulation results for an example showing a cell search in-set rate, when QPSK is wrongly detected as 16QAM under the ETU 70 channel. FIG. 13 illustrates simulation results for an example showing a cell search in-set rate, when 16QAM is ideally detected as 16QAM under ETU70 channel. FIG. 14 illustrates simulation results for an example showing a cell search in-set rate when 64QAM is wrongly detected as 16QAM under ETU70 channel.

For example, even when QPSK data (see FIG. 12) or 64QAM data (see FIG. 14) are all detected as 16QAM, i.e. the correct modulation order detection rate is 0%, good performance can still be obtained. However, the best results are obtained when the modulation order is 100% correctly detected (as shown in FIG. 13). The reason is that even if the modulation order of the interference is wrongly detected, the demodulated interfering data is more likely to be close to the actual data in terms of amplitude and phase, especially when the interference is strong. As such, subtracting these demodulated interfering data will increase the SINR of the target cell, which in turn leads to higher detection rate for the target cell. Examples may enable blind modulation order detection accurately in many cases.

Figure 15:
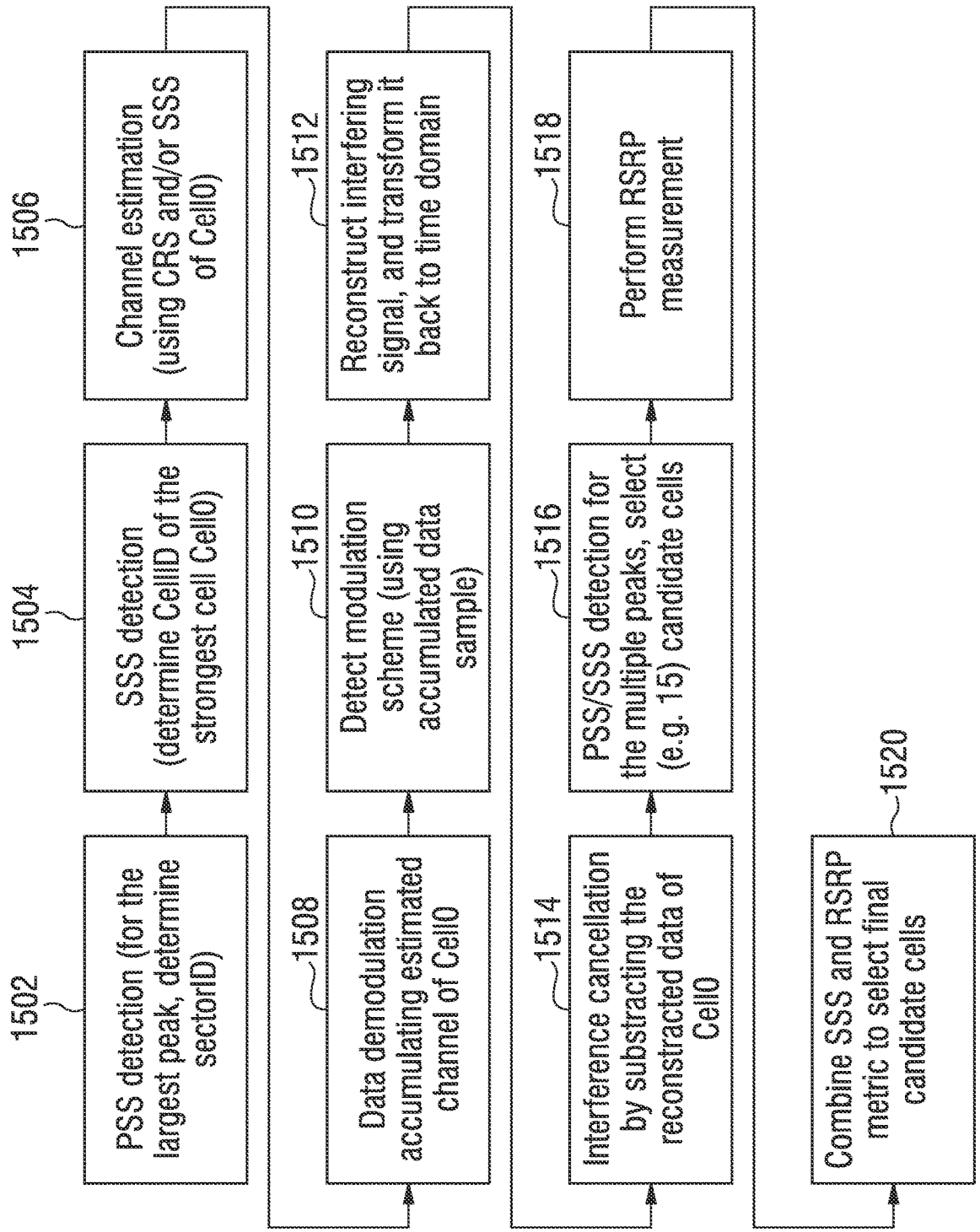
FIG. 15 illustrates a block diagram of an example of a cell search with pilot/data interference cancellation.

FIG. 15 illustrates a block diagram of an example of a cell search with pilot/data interference cancellation. The example procedure of the cell search through cancelling interference from one cell can be summarized as follows. The procedure can straightforwardly be repeated using SIC for multiple interfering cells, usually in the order of decreasing interference power (see FIG. 6 and FIG. 15). As shown in FIG. 15 in block 1502 PSS detection for the largest peak may be carried out and the sectorID may be determined. For example, in line with FIG. 1 the control module 14 may be configured to transform the receive signal to the frequency domain, based on an estimated timing of the interfering signal. In block 1504 the SSS may be detected and the cell-ID of the strongest cell may be determined. Channel estimation using CRS and/or SSS of cell 0 may be carried out in block 1506, before data is demodulated and the channel of cell0 is accumulated in block 1508. The control module 14 is then configured to estimate a radio channel for the interfering signal based on pilot symbols comprised in the interfering signal.

In block 1510 the modulation scheme may be detected based on the accumulated data sample. The control module 14 is then configured to detect a modulation order of symbols of the interfering signal, and to demodulate interfering data from the receive signal based on the detected modulation order. The interfering signal can then be reconstructed in block 1512 and transformed back into the time domain. The control module 14 is then configured to reconstruct a frequency domain interfering signal based on the demodulated interfering data and to reconstruct a time domain interfering signal. As further illustrated in FIG. 15 in block 1514 interference cancellation may be carried out by subtracting the reconstructed data of cell 0 from the receive signal. The control module 14 is then configured to subtract the interfering signal from the receive signal in the time domain to obtain a residual signal. PSS/SSS detection may then be carried out for multiple peaks and candidate cells (e.g. 15) may be selected. An RSRP measurement may be performed in subsequent block 1518 before SSS and RSRP metric are combined to select the final candidate cells in block 1520. The control module 14 may then be configured to perform cell search based on the residual signal.

Summarizing the method in an example:
a) Transform the received signal r into the frequency domain, say R, based on the timing of the interferer;
b) Estimate the interferer channel, say $\hat{H}$. For known interfering pilot symbols, this can be done directly using the LS algorithm followed by a Wiener filter. For unknown interfering data symbols, this can be done using CRS followed by a Wiener interpolator;
c) Detect the modulation order of the interferer when it is unknown, e.g. based on the sample data distribution. Here an inverse precoding may be applied prior to the modulation order detection;
d) Demodulate the interfering data based on the (detected) modulation order (QPSK, 16QAM, 64QAM, or 256QAM) when the data are unknown, e.g. by selecting the transmit symbol which is the closest to $R/\hat{H}$ on the constellation;
e) Reconstruct the frequency domain interfering signal S which can have multiple symbols (incl. PSS/SSS, PDCCH, CRS, and data symbol);
f) Reconstruct the time domain interfering signal from the frequency domain;
g) Subtract the interfering signal from the received signal in time domain; and
h) Send the residual signal to a conventional cell searcher, or go to a) to cancel the next interferer.

Figure 16:
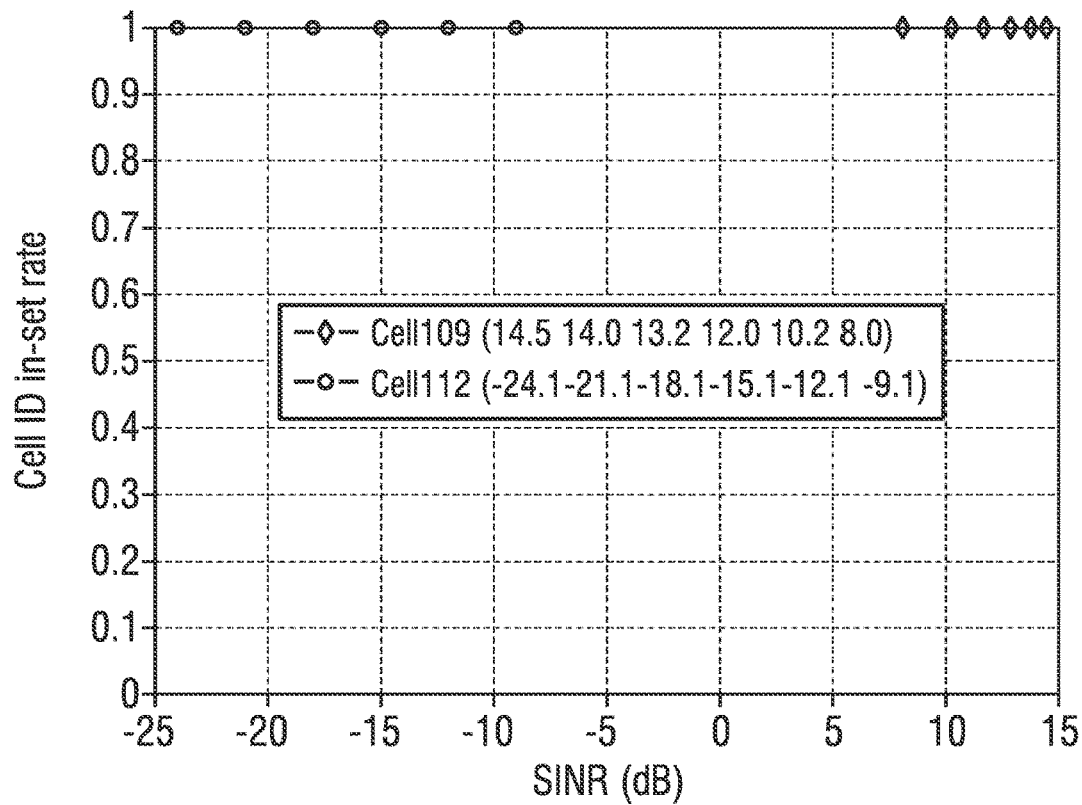
FIG. 16 illustrates simulation results of an example for a cell search in-set rate for interfering and target cells (top), and modulation scheme detection rate for an interfering cell (bottom) for QPSK under AWGN channel.
Figure 16:
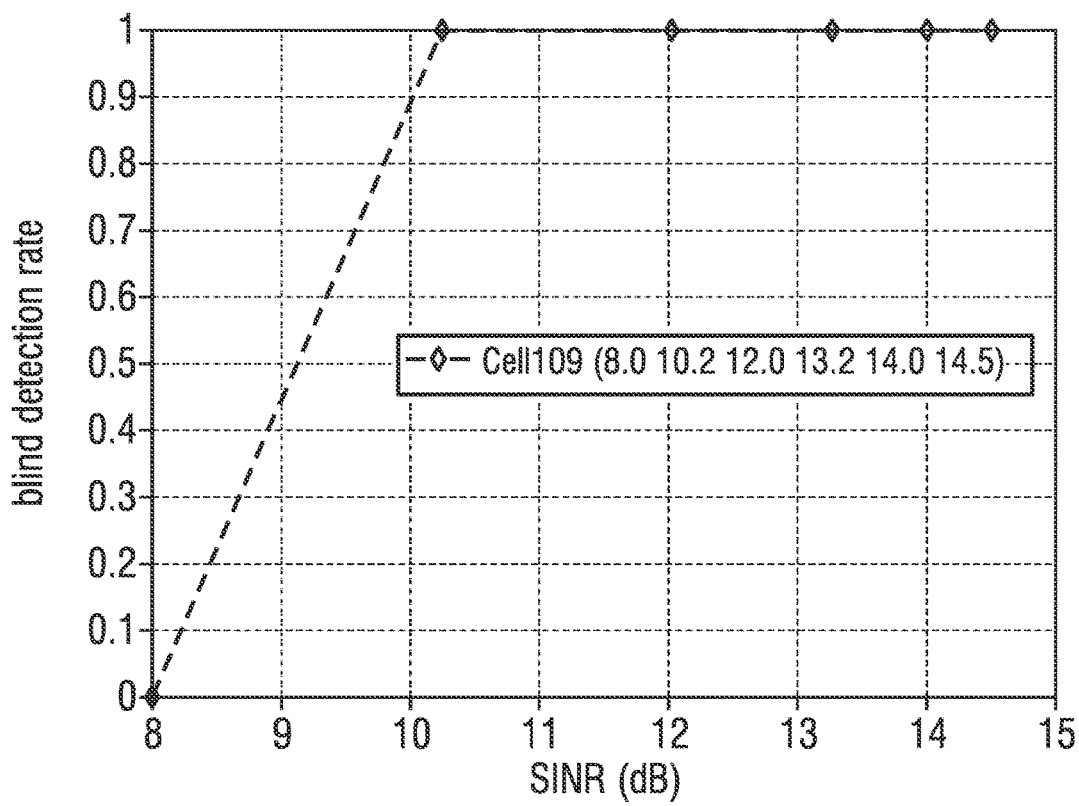
Figure 17:
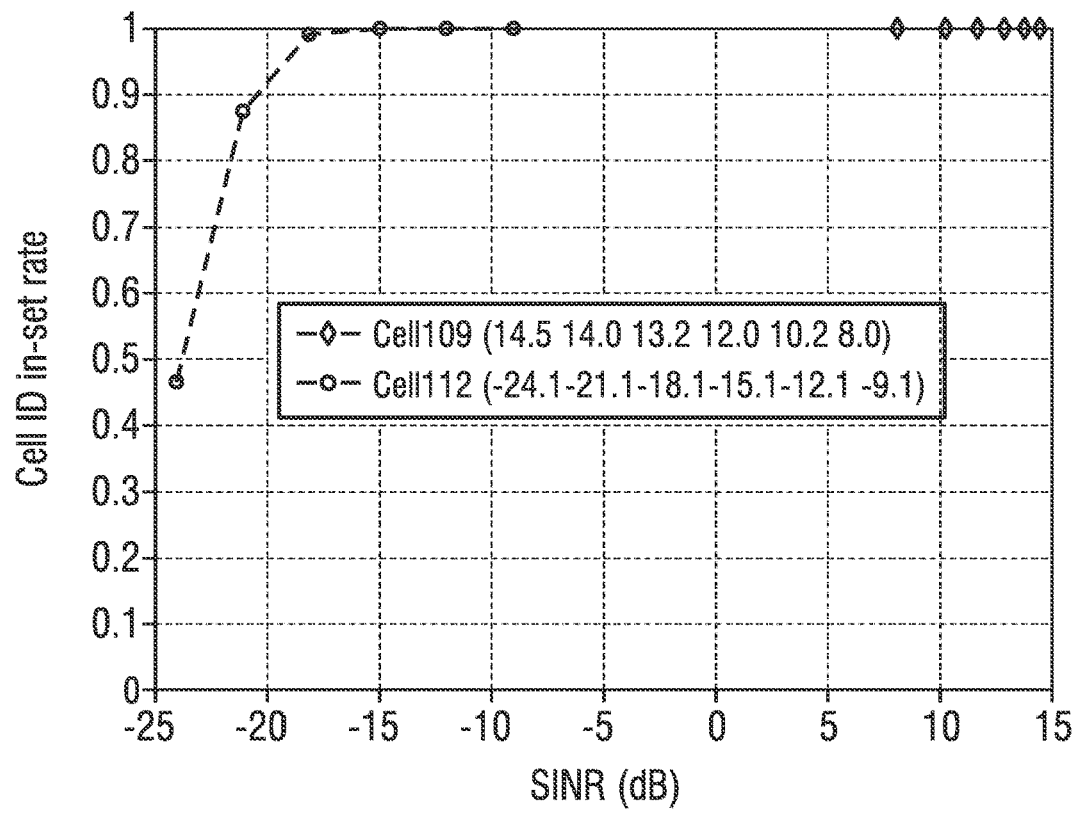
FIG. 17 illustrates simulation results of an example for a cell search in-set rate for interfering and target cells (top), and modulation scheme detection rate for an interfering cell (bottom) for QPSK under ETU70 channel.
Figure 17:
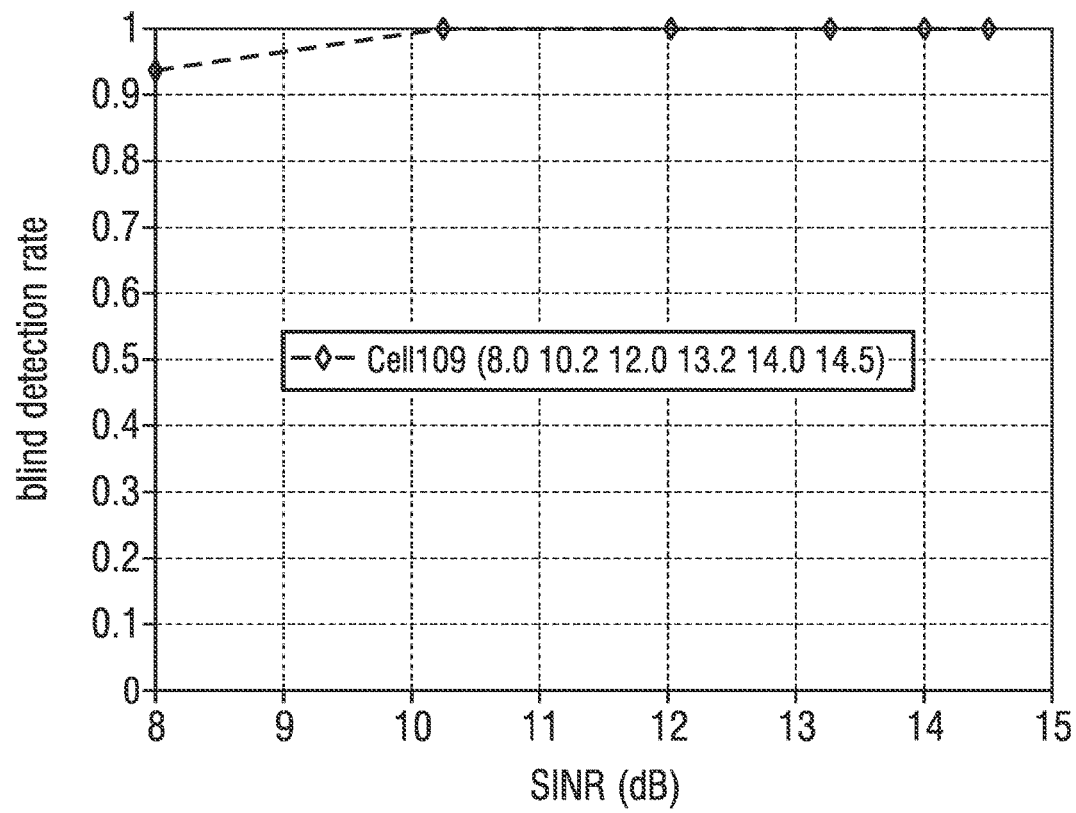
Figure 18:
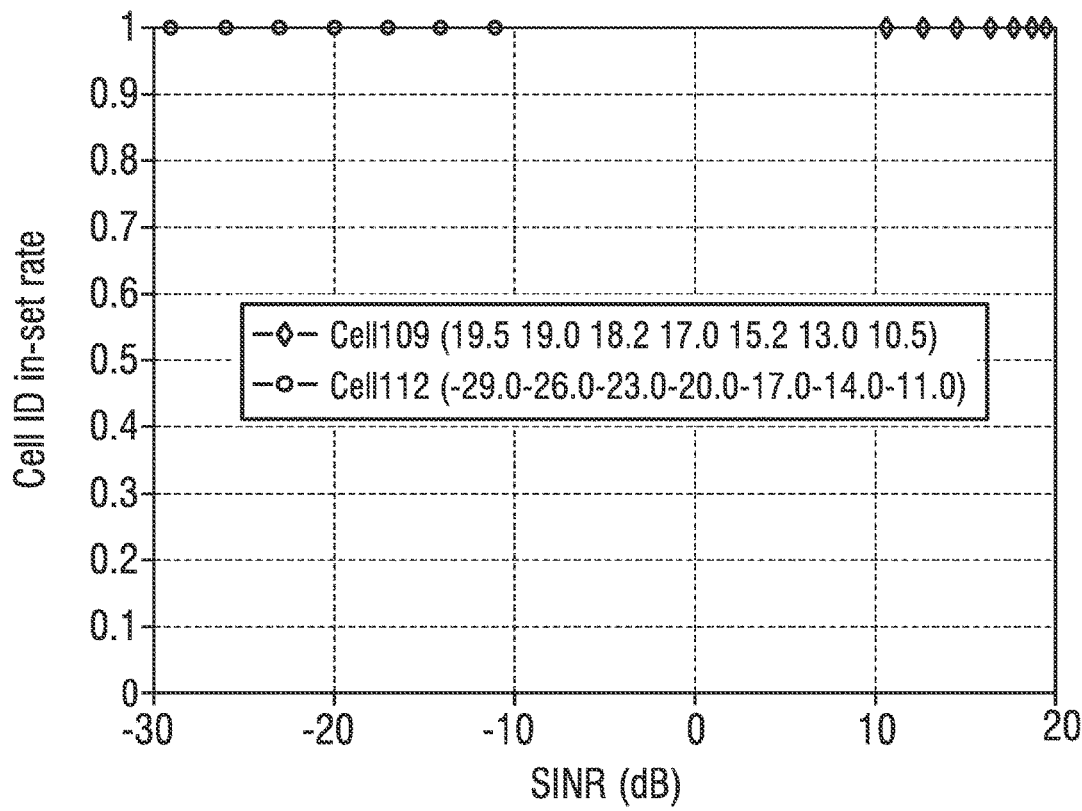
FIG. 18 illustrates simulation results of an example for a cell search in-set rate for interfering and target cells (top), and modulation scheme detection rate for interfering cell (bottom) for 16QAM under AWGN channel.
Figure 18:
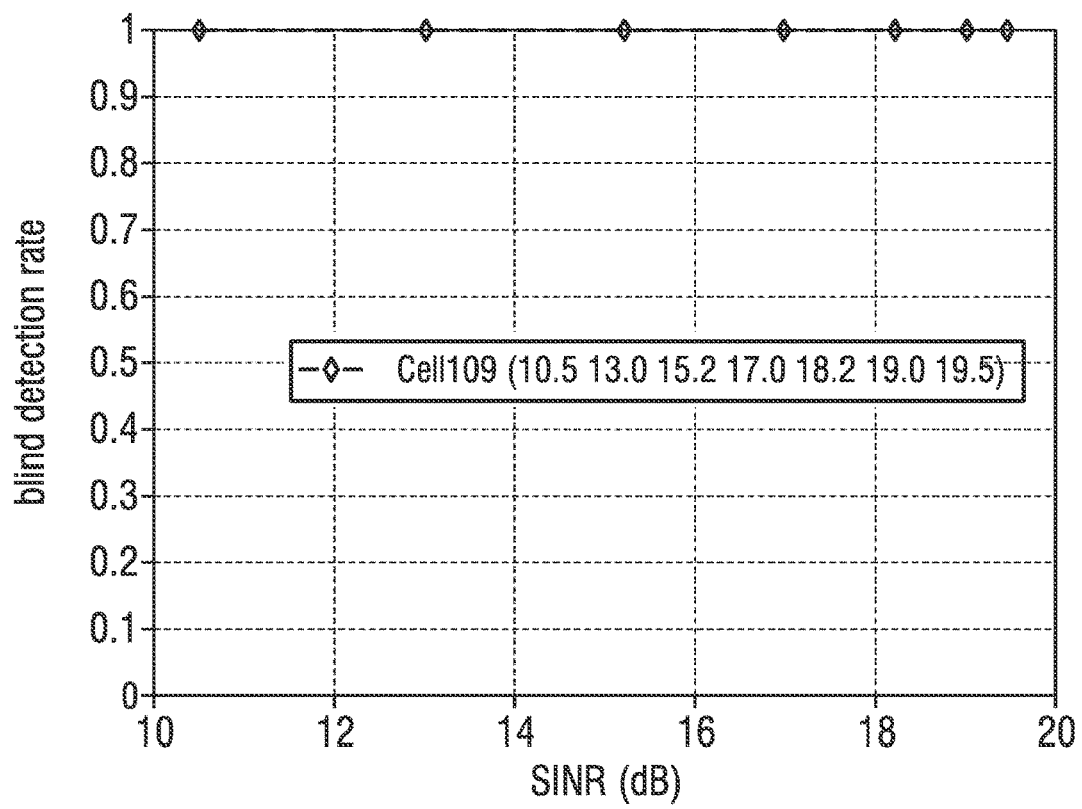
Figure 19:
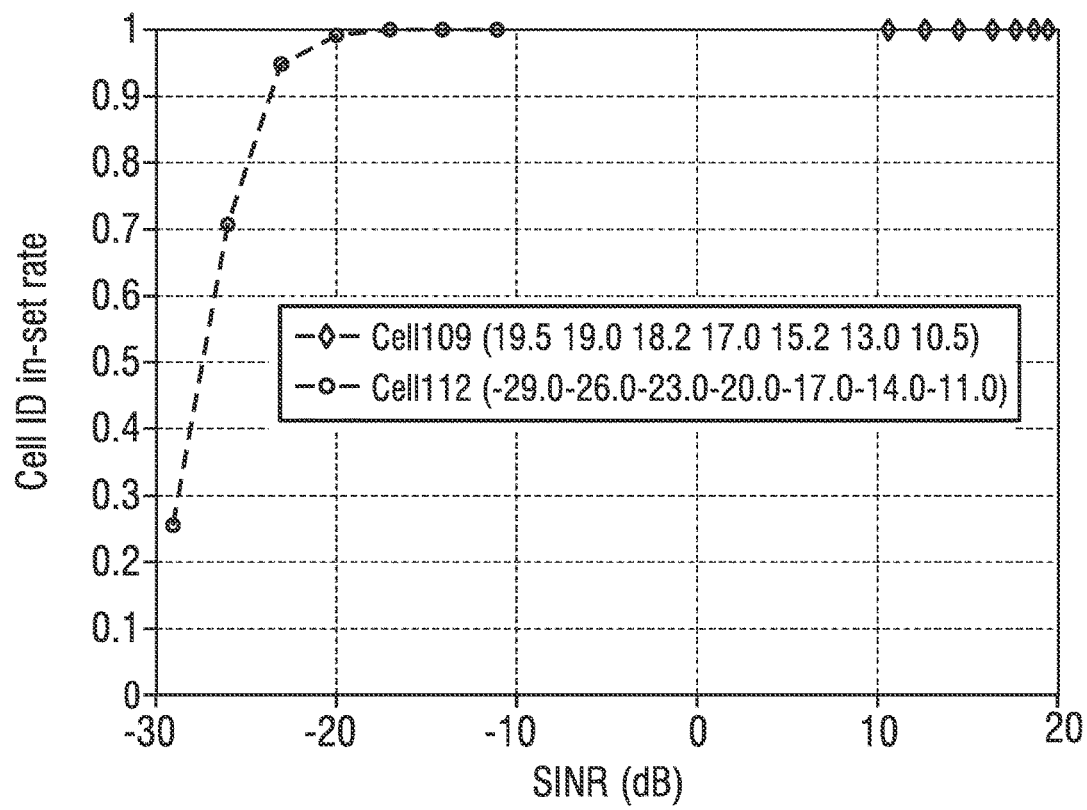
FIG. 19 illustrates simulation results of an example for a cell search in-set rate for interfering and target cells (top), and modulation scheme detection rate for interfering cell (bottom) for 16QAM under ETU70 channel.
Figure 19:
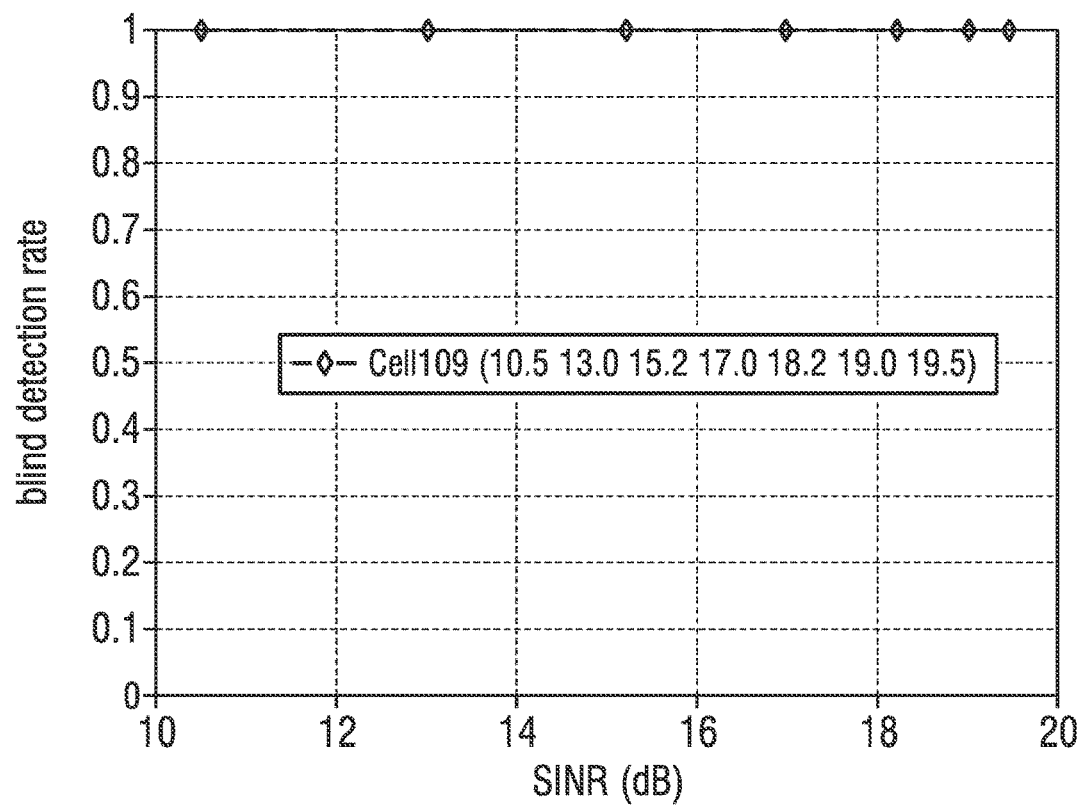
Figure 20:
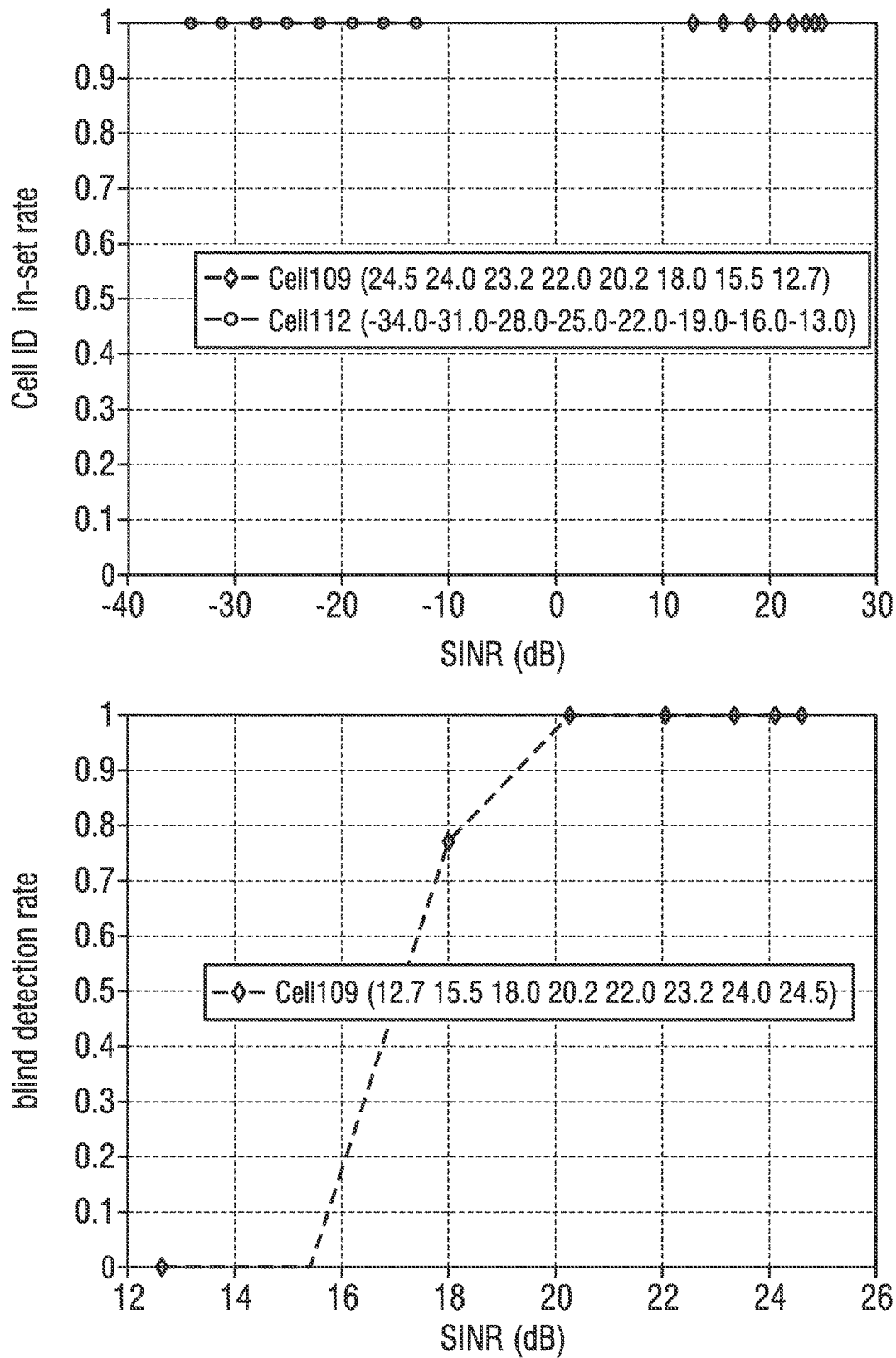
FIG. 20 illustrates simulation results of an example for a cell search in-set rate for interfering and target cells (top), and modulation scheme detection rate for interfering cell (bottom) for 64QAM under AWGN channel.
Figure 21:
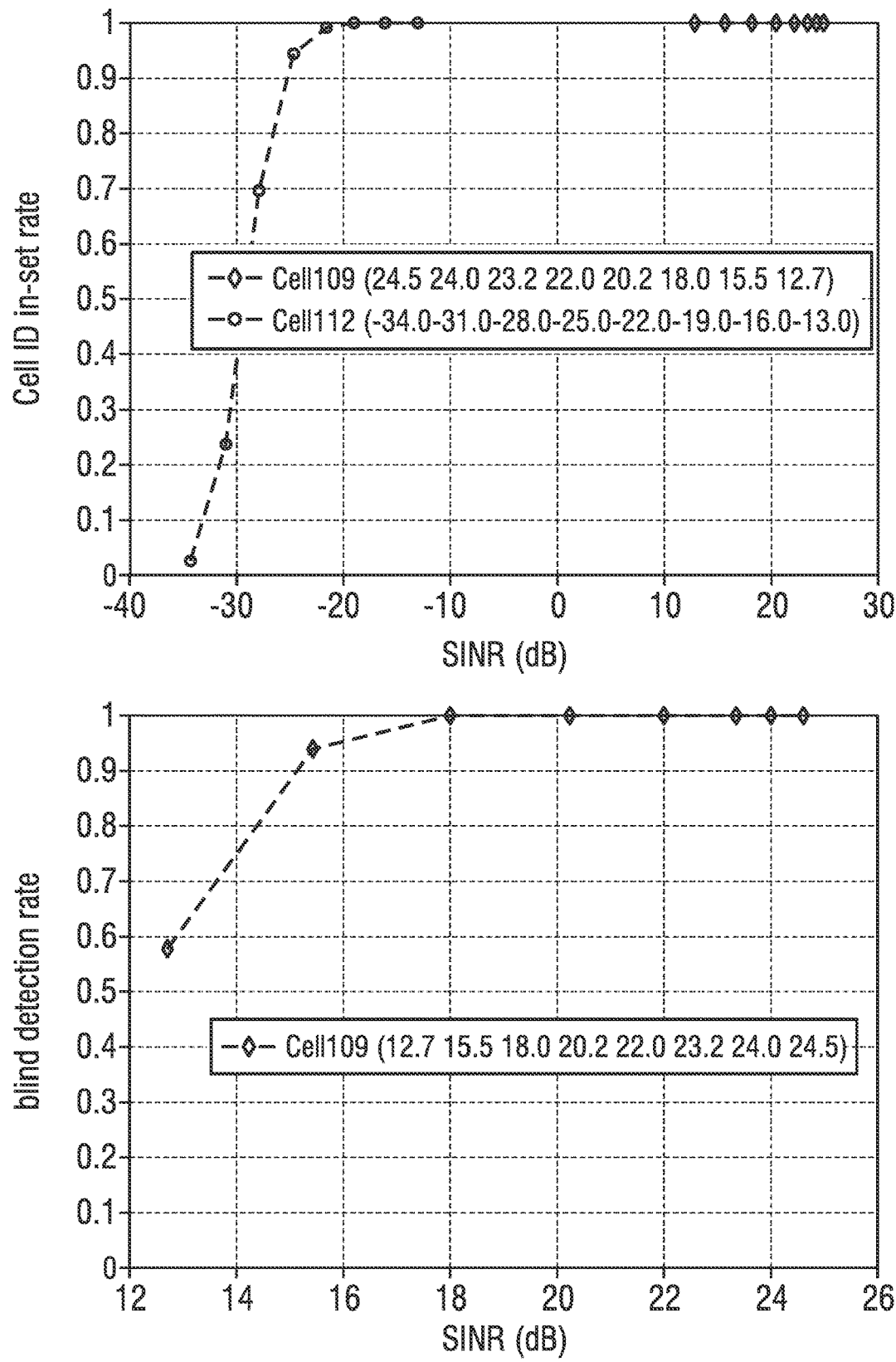
FIG. 21 illustrates simulation results of an example for a cell search in-set rate for interfering and target cells (top), and modulation scheme detection rate for interfering cell (bottom) for 64QAM under ETU70 channel.

FIGS. 16-21 show simulation results, which were obtained for the 2-cell simulation scenario as described above. FIG. 16 illustrates simulation results of an example for a cell search in-set rate for interfering and target cells (top), and modulation scheme detection rate for an interfering cell (bottom) for QPSK under AWGN channel. FIG. 17 illustrates simulation results of an example for a cell search in-set rate for interfering and target cells (top), and modulation scheme detection rate for an interfering cell (bottom) for QPSK under ETU70 channel. FIG. 18 illustrates simulation results of an example for a cell search in-set rate for interfering and target cells (top), and modulation scheme detection rate for interfering cell (bottom) for 16QAM under AWGN channel. FIG. 19 illustrates simulation results of an example for a cell search in-set rate for interfering and target cells (top), and modulation scheme detection rate for interfering cell (bottom) for 16QAM under ETU70 channel. FIG. 20 illustrates simulation results of an example for a cell search in-set rate for interfering and target cells (top), and modulation scheme detection rate for interfering cell (bottom) for 64QAM under AWGN channel. FIG. 21 illustrates simulation results of an example for a cell search in-set rate for interfering and target cells (top), and modulation scheme detection rate for interfering cell (bottom) for 64QAM under ETU70 channel.

Notice that the number of the transmit antennas of an interfering eNB can be blindly detected, say, by checking their CRSs. For cell search, the performance was given in terms of the in-set rate, which is defined as the rate of a cell belonging to the 15 strongest cells provided to RSRP measurement. For blind detection, the correct detection rate is displayed in the Figs. For QPSK, the in-set rate 100% was obtained for AWGN channel despite the fact that the blind detection is not always successful. A reasonable explanation is that when the target cell has low SINR, the interfering cell will have high SINR so that the blind detection of the modulation order of the interfering cell can be done more easily. As can be seen from FIGS. 16 and 17, even for the challenging channel ETU70, the in-set rate can be kept greater than 90% when the SINR drops below −20 dB. For SINR around −15 dB, a 100% in-set rate can be obtained. Similar behavior can be observed for 16QAM and 64QAM modulations. Notice that with the Adaptive Modulation Coding (AMC) enabled in LTE, higher order modulation (e.g. 64QAM) is used for higher SINK (see FIGS. 20 and 21).

Figure 22:
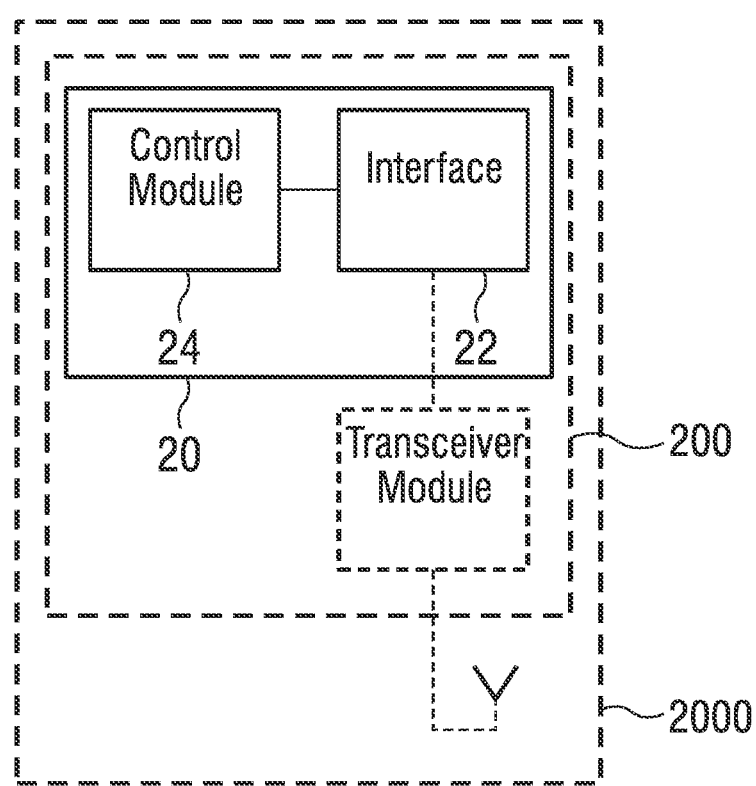
FIG. 22 shows another example of an apparatus for a transceiver of a mobile communication system.

In the following some further examples will be explained, which make use of network configurations supporting efficient cell search with data interference cancellation. FIG. 22 shows another example of an apparatus 20 for a transceiver 200 of a mobile communication system 500. The apparatus 20 comprises an interface 22, which is configured to provide information related to transmit signals (or transmit signal information). The interface may be implemented similar to the above described interface 12. The apparatus 20 further comprises a control module 24 which is coupled to the interface 22. The control module 24 is configured to provide, via the interface 22, information related to a synchronization signal (synchronization signal information) to be transmitted on a frequency resource of the mobile communication system 500. The control module 24 is further configured to provide, via the interface 22, information related to a broadcast signal (broadcast signal information) comprising information related to symbols (symbol information) of other signals using the frequency resource. The control module 24 may be implemented in a similar way as the above-described control module 14. Other examples are a transceiver 200 comprising the apparatus 20. In some examples the transceiver 200 may comprise a transceiver module 26, which is coupled to the interface 22, as shown as optional component (dashed line) in FIG. 22. Another example is a base station 2000 comprising the transceiver 200 as also shown in FIG. 22 as optional component. The transceiver module 26 may be implemented in line with the transceiver module 16 as described above.

The symbol information of other signals using the frequency resource may correspond to any information relating to the transmission of these symbols. For example, the symbol information of other signals using the frequency resource comprises a time alignment information or a degree information of synchronization of the synchronization signal and another synchronization signal transmitted by another transceiver 310, cf. FIG. 1. The symbol information of other signals using the frequency resource may, for example, indicate a modulation order of symbols potentially interfering with the synchronization signal or another synchronization signal transmitted by another transceiver 310. On the side of the apparatus 10, the control module 14 may then be configured to determine the modulation order information based on broadcast information from the second cell. The symbol information of other signals using the frequency resource may indicate symbols transmitted on the frequency resource and having a specific pre-coding or modulation.

Examples may make use of a network that is configured such that the UE can easily and efficiently do the blind modulation order detection and symbol cancellation for the (control and/or user) data from the strong interfering cells. Notice that interference may be cancelled or reduced in examples, contrary to (F)eICIC, where so-called Almost Blank Sub-frames (ABS) are used so that the interference is avoided. In this way, high-performance and low-complexity search for very weak cells may become possible, irrespective whether the cells are synchronous or asynchronous. In principle in some examples the network may rely on blind detection capabilities of terminals, however, the network operator might not have control over the performance. Terminals may have different design objectives, and not all may feature a perfect algorithm for detection. NW support may help for a wide spread utilization of cancellation, and may enable a power efficient terminal operation.

For example, LTE/LTE-A defines different transmission modes (TM). Except for the TM 1 and 2, a precoding matrix is employed. When a precoding is applied, the resulting complex-valued symbols at REs are a superposition or a weighted sum of multiple QPSK, 16QAM or 64QAM complex-values. In order to detect the modulation order, some examples may first detect the precoding applied. Since LTE/LTE-A defines very limited number of transmission modes and precoding matrices, e.g. up to 16 for 4×4 MIMO, an exhaustive search for the most-likely matrix among all possible precoding matrices may be feasible in some examples. This, however, may demand high computational efforts at the UE.

In some examples the network may avoid the exhaustive search, and save battery, if measures are taken from the NW side, and the terminal receives information about these measures, e.g. in terms of the information related to symbols of other signals (symbol information) using the frequency resource also used by the synchronization signal. Some examples may enhance System Information Broadcast (SIB) messages of the existing LTE signaling.

Some further examples of NW configurations enabling efficient cell search with data interference cancellation will be described in the following. In case of a synchronous NW, the UE may receive signals from different cells having a timing difference of 0.5 ms or less, as shown above. The NW may, for example, be configured such that the user data in the subframes containing the sync symbols of all (or specifically known strong) cells have no precoding or a known precoding. As a result, the sync symbol of the target weak (e.g. a macro) cell, which usually arrives at UE later than the sync symbol of the (strong) interfering (e.g. a pico) cell, will be interfered by the data from the interfering cell. By detecting the modulation scheme of the data, strong interference may then be canceled or reduced.

In another example, an apparatus 20 may schedule or distribute the PSS/SSS signals of target and interfering cells such that they are located within the first 3 OFDM symbols of a subframe. Since the first 3 OFDM symbols are occupied only by the physical control channels where the modulation order is known as QPSK, no blind modulation order detection may be required on the apparatus 10 side. In a further example, an apparatus 20 may periodically schedule TM 1, 2 slots within a transmission. The Network informs all UE in a cell by a SIB message about the position and periodicity of TM1/2 frames. By this the UE may have a prior knowledge of the TM1/2 transmissions and may efficiently do the interference detection by knowing that no precoding is used. The search algorithm can be simplified, uses less battery and may be faster. The individual user throughput might be slightly lower depending on the periodicity of the TM 1/2 slots. This may be individually adjusted for cells, by experiencing how fast the interference situation may change. Adaptation of such concepts may be carried out in examples by the respective control modules 14, 24.

Use TM 1, 2 only, or use of only a lower number of pre-defined precoding matrices to reduce the efforts for the precoding matrix detection may be applied in some further examples. This may help to reduce the efforts for the precoding matrix detection. This may use an example of the method described above, but the individual user throughput loss may be reduced by allowing a restricted set of precoding matrices. The algorithm may be a bit more complex, and may consume more power, but it may allow a tradeoff between detection complexity and user throughput.

Further examples may use UE reporting cell search interference cancellation load. At the apparatus 10 the control module 14 may be configured to determine a processing load information for determining the identification information of the cell and to provide the processing load information to the first cell, base station or transceiver of the mobile communication system 500. On the apparatus 20 side, the control module 24 may then be configured to obtain a processing load information for determining an identification information of a cell. The control module 24 may be further configured to adjust an assisted interference cancellation mechanism based on the processing load information and to adapt a provision of the symbol information based on the processing load information.

Depending on the interference situation in a cell, i.e. the level of interference, the number of sources, and the volatility of the interference situation, the cell search needs may vary from cell type (macro/micro) NW load etc. By introducing an uplink signaling information element, a UE can report to the network a cell search with interference cancellation operational load. If the NW detects a high number of UE, conducting high rate cell search activities with cancellation, the network may apply or adjust parameters as previously described, e.g. activating periodic TM1/2 slots, or increasing the frequency of their occurrences.

Figure 23:
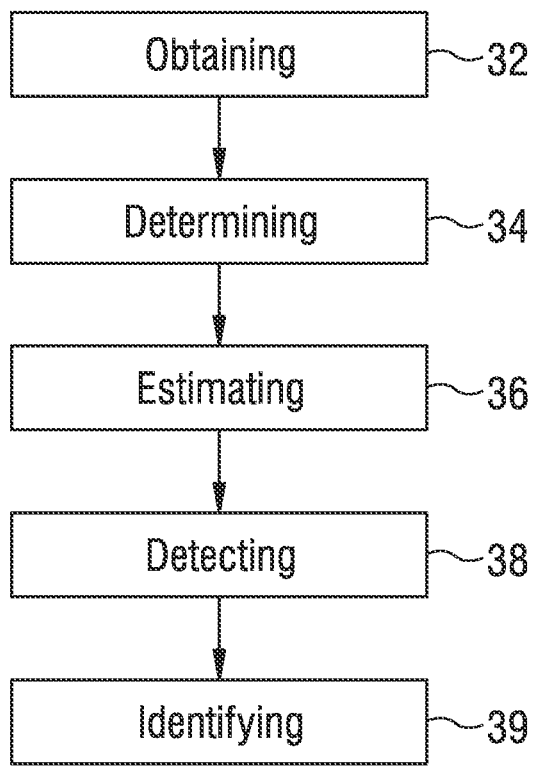
FIG. 23 shows a block diagram of a flow chart of an example of a method for a transceiver in a mobile communication system.

FIG. 23 shows a block diagram of a flow chart of an example of a method for a transceiver 100 of a mobile communication system 500. The method comprises obtaining 32 a receive signal information. The receive signal may be based on at least two transmit signals of cells 300, 310 of the mobile communication system 500, cf. FIG. 1 as well. The method further comprises determining 34 a first cell 300 identification information of the mobile communication system 500 based on the receive signal information. The method further comprises estimating 36 an interfering signal information transmitted by a second cell 310 of the mobile communication system 500 based on the receive signal information. The interfering signal comprises control or payload data information of a second transceiver 110. The method further comprises detecting 38 a synchronization signal information transmitted for the cell 300 based on the receive signal information and the interfering signal information. The method further comprises identifying 39 the first cell 300 identifying information based on the synchronization signal information. In a further example of the method, the identifying 39 may be carried out as part of a cell search procedure in the mobile communication system 500.

Figure 24:
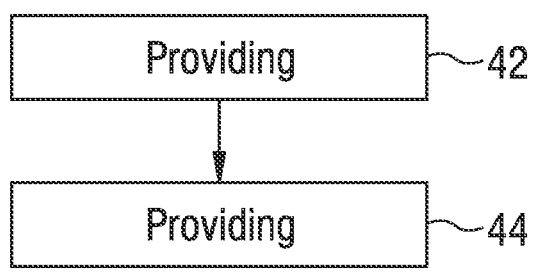
FIG. 24 shows a block diagram of a flow chart of an example of a method for a transceiver in a mobile communication system.

FIG. 24 shows a block diagram of a flow chart of an example of a method for a transceiver 200 of a mobile communication system 500. The method comprises providing 42 a synchronization signal information to be transmitted on a frequency resource of the mobile communication system 500. The method further comprises providing 44 a broadcast signal information comprising symbol information of other signals using the frequency resource. In a further example the providing 44 may be carried out as part of a cell search procedure in the mobile communication system 500. The method may further provide network assisted interference cancellation for the cell search procedure.

Examples further provide a computer program having a program code for performing at least one of the above methods, when the computer program is executed on a computer, a processor, or a programmable hardware component. A further example is a computer readable storage medium storing instructions which, when executed by a computer, processor, or programmable hardware component, cause the computer to implement one of the methods described herein.

Examples may provide a cell searcher for an LTE-like OFDM system, which can blindly detect and cancel/reduce interfering data symbols. Examples may be used for FDD and TDD LTE/LTE-A synchronous and asynchronous networks, and probably for future 5G systems. For two-cell scenarios, target cells with SINR lower than −20 dB may be reliably detected, irrespective whether the cells are synchronous or asynchronous. Moreover, network configurations according to at least some examples may support efficient cell search with data/control interference cancellation.

The examples as described herein may be summarized as follows:

In example 1 an apparatus 10 for a first transceiver 100 of a mobile communication system 500 comprises an interface 12 configured to obtain a receive signal information. The receive signal may be based on at least two transmit signals of cells 300; 310 of the mobile communication system 500. The apparatus 10 further comprises a control module 14 configured to determine a first cell 300 identifying information of the mobile communication system 500 based on the receive signal information. The control module 14 is configured to estimate an interfering signal information transmitted by a second cell 310 of the mobile communication system 500 based on the receive signal information. The interfering signal comprises control or pay-load data information of a second transceiver 110. The control module 14 is configured to detect a synchronization signal information transmitted for the first cell 300 based on the receive signal information and the interfering signal information. The control module 14 is configured to identify the first cell 300 identifying information based on the synchronization signal information.

In example 2 the control module 14 is configured to detect the synchronization signal information according to a primary and a secondary synchronization channel broadcast by the first cell 300.

In example 3 the control module 14 is configured to estimate the interfering signal information using blind detection.

In example 4 the control module 14 is configured to detect the synchronization signal information by cancelling parts of the receive signal information based on the interfering signal information.

In example 5 the control module 14 is configured to identify modulation order information of an interfering symbol within the interfering signal before estimating the interfering signal information.

In example 6 the control module 14 is configured to identify the modulation order information based on broadcast information from the second cell.

In example 7 the control module 14 is configured to estimate a radio channel information between a transmitter of the interfering signal and the first transceiver 100, and the control module 14 is configured to estimate the interfering signal information based on the radio channel information and the modulation order information.

In example 8 the control module 14 is configured to estimate the radio channel information between the transmitter of the interfering signal and the first transceiver 100 based on one or more reference symbols comprised in the interfering signal.

In example 9 the control module 14 is configured to estimate multiple radio channel information between multiple antenna ports of the transmitter of the interfering signal and the first transceiver 100 based on different symbols comprised in the interfering signal.

In example 10 the control module 14 is configured to
transform the receive signal to the frequency domain based on an estimated timing of the interfering signal,
estimate a radio channel for the interfering signal based on pilot symbols comprised in the interfering signal,
detect a modulation order of symbols of the interfering signal,
demodulate interfering data from the receive signal based on the detected modulation order,
reconstruct a frequency domain interfering signal based on the demodulated interfering data,
reconstruct a time domain interfering signal,
subtract the interfering signal from the receive signal in the time domain to obtain a residual signal, and
perform cell search based on the residual signal.

In example 11 the control module 14 is configured to identify the first cell as part of a cell search procedure before accessing a data service of the mobile communication system 500.

In example 12 the control module 14 is configured to identify a plurality of cell identifications using reception quality measures for a plurality of synchronization channels, and the control module 14 is configured to determine the identification information of the first cell 300 for which a reception quality measure indicates a reception quality above a predetermined threshold.

In example 13 the control module 14 is configured to estimate a precoding information applied to the interfering signal and to detect the synchronization signal information further based on the estimated precoding.

In example 14 the control module 14 is configured to determine a processing load information for determining the identification information of the first cell and to provide the processing load information to the first cell of the mobile communication system 500.

In example 15 an apparatus 20 for a transceiver 200 of a mobile communication system 500 comprises an interface 22 configured to provide transmit signal information. The apparatus 20 further comprises a control module 24 configured to provide, via the interface 22, a synchronization signal information to be transmitted on a frequency resource of the mobile communication system 500, and to provide, via the interface 22, a broadcast signal information comprising symbol information of other signals using the frequency resource.

In example 16 the symbol information of other signals using the frequency resource comprises a time alignment information or a degree information of synchronization of the synchronization signal and another synchronization signal transmitted by another transceiver 310.

In example 17 the symbol information of other signals using the frequency resource indicates a modulation order of symbols potentially interfering with the synchronization signal or another synchronization signal transmitted by another transceiver 310.

In example 18 the symbol information of other signals using the frequency resource indicates symbols transmitted on the frequency resource and having a specific precoding or modulation.

In example 19 the control module 24 is configured to obtain a processing load information for determining an identification information of a cell, and the control module 24 is configured to adjust an assisted interference cancellation mechanism based on the processing load information and to adapt a provision of the symbol information based on the processing load information.

In example 20 a transceiver 100 comprises the apparatus 10 according to the above.

In example 21 the transceiver 100 further comprises a transceiver module 16 configured to receive the receive signal, and the transceiver module 16 is coupled to the interface 12.

In example 22 a mobile transceiver 1000 of a mobile communication system 500 comprises the above transceiver 100.

In example 23 a transceiver 200 comprises the apparatus 20 according to the above.

In example 24 the transceiver 200 further comprises a transceiver module 26 configured to receive the receive signal, wherein the transceiver module 26 is coupled to the interface 22.

In example 25 a base station transceiver 2000 comprises the above transceiver 200.

In example 26 a method for a transceiver 100 of a mobile communication system 500 comprises obtaining 32 a receive signal information. The receive signal may be based on at least two transmit signals of cells 300; 310 of the mobile communication system 500;
determining 34 a first cell 300 identifying information of the mobile communication system 500 based on the receive signal information;
estimating 36 an interfering signal information transmitted by a second cell 310 of the mobile communication system 500 based on the receive signal information. The interfering signal comprising control or payload data information of a second transceiver 110;
detecting 38 a synchronization signal information transmitted for the cell 300 based on the receive signal information and the interfering signal information; and
identifying 39 the first cell 300 identifying information based on the synchronization signal information.

In example 27 the identifying 39 is carried out as part of a cell search procedure in the mobile communication system 500.

In example 28 the method further comprises detecting the synchronization signal information according to a primary and a secondary synchronization channel broadcast by the cell 300.

In example 29 the estimating 36 of the interfering signal information uses blind detection.

In example 30 the detecting 38 of the synchronization signal information uses cancelling parts of the receive signal information based on the interfering signal information.

In example 31 the method further comprises determining a modulation order information of an interfering symbol within the interfering signal before estimating the interfering signal information.

In example 32 the determining of the modulation order information is based on broadcast information from the second cell.

In example 33 the method further comprises estimating a radio channel information between a transmitter of the interfering signal and the transceiver 100, and the estimating 36 of the interfering signal information is based on the radio channel information and the modulation order information.

In example 34 the estimating of the radio channel information between the transmitter of the interfering signal and the first transceiver 100 is based on one or more reference symbols comprised in the interfering signal.

In example 35 the method further comprises estimating multiple radio channels information between multiple antenna ports of the transmitter of the interfering signal and the first transceiver 100 based on different symbols comprised in the interfering signal.

In example 36 the method further comprises
transforming the receive signal to the frequency domain based on an estimated timing of the interfering signal,
estimating a radio channel for the interfering signal based on pilot symbols comprised in the interfering signal,
detecting a modulation order of symbols of the interfering signal,
demodulating interfering data from the receive signal based on the detected modulation order,
reconstructing a frequency domain interfering signal based on the demodulated interfering data,
reconstructing a time domain interfering signal,
subtracting the interfering signal from the receive signal in the time domain to obtain a residual signal, and
performing cell search based on the residual signal.

In example 37 the identifying 39 of the identification of the cell is part of a cell search procedure before accessing a data service of the mobile communication system 500.

In example 38 the method further comprises determining a plurality of cell identifications information using reception quality measures for a plurality of synchronization channels, and the identifying 39 of the identification information refers to a first cell for which a reception quality measure indicates a reception quality above a predetermined threshold.

In example 39 the method further comprises estimating a precoding information applied to the interfering signal and the detecting 38 of the synchronization signal information is further based on the estimated precoding information.

In example 40 the method further comprises determining a processing load information for determining the identification information of the first cell and providing the processing load information to the first cell of the mobile communication system 500.

In example 41 a method for a transceiver 200 of a mobile communication system 500 comprises providing 42 a synchronization signal information to be transmitted on a frequency resource of the mobile communication system 500, and providing 44 a broadcast signal information comprising symbol information of other signals using the frequency resource.

In example 42 the providing 44 is carried out as part of a cell search procedure in the mobile communication system 500, the method further providing network assisted interference cancellation for the cell search procedure.

In example 43 the symbol information of other signals using the frequency resource comprises a time alignment information or a degree information of synchronization of the synchronization signal and another synchronization signal transmitted by another transceiver 310.

In example 44 the symbol information of other signals using the frequency resource indicates a modulation order of symbols potentially interfering with the synchronization signal or another synchronization signal transmitted by another transceiver 310.

In example 45 the symbol information of other signals using the frequency resource indicates symbols transmitted on the frequency resource and having a specific precoding or modulation.

In example 46 the method further comprises obtaining a processing load information for determining the identification information of the first cell, and further comprises adjusting an assisted interference cancellation mechanism based on the processing load information and adapting a provision of the symbol information based on the processing load information.

In example 47 a machine readable storage medium includes program code, when executed, to cause a machine to perform one of the above-described methods.

In example 48 a computer program has a program code for performing at least one of the above methods, when the computer program is executed on a computer, a processor, or a programmable hardware component.

In example 49 an apparatus 10 for a transceiver 100 of a mobile communication system 500 comprises means for 12 obtaining a receive signal information. The receive signal may be based on at least two transmit signals of cells 300; 310 of the mobile communication system 500. The apparatus 10 further comprises means 14 for
determining a first cell 300 identification information of the mobile communication system 500 based on the receive signal information,
estimating an interfering signal information transmitted by a second cell 310 of the mobile communication system 500 based on the receive signal information. The interfering signal comprises control or payload data information of a second transceiver 110,
detecting a synchronization signal information transmitted for the cell 300 based on the receive signal information and the interfering signal information, and
identifying the first cell 300 identifying information based on the synchronization signal information.

In example 50 the means 14 is configured to detect the synchronization signal information according to a primary and a secondary synchronization channel broadcast by the cell 300.

In example 51 the means 14 is configured to estimate the interfering signal information using blind detection.

In example 52 the means 14 is configured to detect the synchronization signal information by cancelling parts of the receive signal information based on the interfering signal information.

In example 53 the means 14 is configured to determine a modulation order information of an interfering symbol within the interfering signal before estimating the interfering signal information.

In example 54 the means 14 is configured to determine the modulation order information based on broadcast information from the other cell.

In example 55 the means 14 is configured to estimate a radio channel information between a transmitter of the interfering signal and the first transceiver 100, and the means 14 is configured to estimate the interfering signal information based on the information the radio channel information and the modulation order information.

In example 56 the means 14 is configured to estimate the radio channel information between the transmitter of the interfering signal and the first transceiver 100 based on one or more reference symbols comprised in the interfering signal.

In example 57 the means 14 is configured to estimate multiple radio channels information between multiple antenna ports of the transmitter of the interfering signal and the first transceiver 100 based on different symbols comprised in the interfering signal.

In example 58 the means 14 is configured to
transform the receive signal to the frequency domain based on an estimated timing of the interfering signal,
estimate a radio channel for the interfering signal based on pilot symbols comprised in the interfering signal,
detect a modulation order of symbols of the interfering signal,
demodulate interfering data from the receive signal based on the detected modulation order,
reconstruct a frequency domain interfering signal based on the demodulated interfering data,
reconstruct a time domain interfering signal,
subtract the interfering signal from the receive signal in the time domain to obtain a residual signal, and
perform cell search based on the residual signal.

In example 59 the means 14 is configured to identify the first cell 300 as part of a cell search procedure before accessing a data service of the mobile communication system 500.

In example 60 the means 14 is configured to determine a plurality of cell identifications information using reception quality measures for a plurality of synchronization channels, and the means 14 is configured to determine the identification information of the first cell for which a reception quality measure indicates a reception quality above a predetermined threshold.

In example 61 the means 14 is configured to estimate a precoding information applied to the interfering signal and to detect the synchronization signal information further based on the estimated precoding.

In example 62 the means 14 is configured to determine a processing load information for determining the identification information of the first cell and to provide the processing load information to the first cell of the mobile communication system 500.

In example 63 an apparatus 20 for a transceiver 200 of a mobile communication system 500 comprises means 22 for providing transmit signals information; and
means 24 for
providing, via the means 22, a synchronization signal information to be transmitted on a frequency resource of the mobile communication system 500, and
providing, via the means 22, a broadcast signal information comprising symbol information of other signals using the frequency resource.

In example 64 the symbol information of other signals using the frequency resource comprises a time alignment information or a degree information of synchronization of the synchronization signal and another synchronization signal transmitted by another transceiver 310.

In example 65 the symbol information of other signals using the frequency resource indicates a modulation order of symbols potentially interfering with the synchronization signal or another synchronization signal transmitted by another transceiver 310.

In example 66 the symbol information of other signals using the frequency resource indicates symbols transmitted on the frequency resource and having a specific precoding or modulation.

In example 67 the means 24 is configured to obtain a processing load information for determining the identification information of a cell, and the means 24 is configured to adjust an assisted interference cancellation mechanism based on the processing load information and to adapt a provision of the symbol information based on the processing load information.

A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, exemplify the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry exemplify the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. A method for a mobile transceiver of a mobile communication system, the method comprising:
    obtaining receive signal information related to a receive signal received from at least a first cell and a second cell of the mobile communication system;
    estimating, based on the receive signal information, interfering signal information corresponding to an interfering signal transmitted by the second cell of the mobile communication system, wherein the interfering signal information comprises control or payload data information of a second transceiver;
    detecting synchronization signal information transmitted by the first cell based on the receive signal information and the interfering signal information; and identifying first cell identifying information of the first cell based on the synchronization signal information.

2. A mobile transceiver comprising an apparatus for a first transceiver of a mobile communication system, the apparatus comprising:
    an interface configured to obtain a receive signal information related to a receive signal received from at least a first cell and a second cell of the mobile communication system; and
    a control module configured to:
        estimate, based on the receive signal information, an interfering signal information corresponding to an interfering signal transmitted by the second cell of the mobile communication system, wherein the interfering signal comprises control or payload data information of a second transceiver,
        detect, based on the receive signal information and the interfering signal information, synchronization signal information transmitted by the first cell, and identify first cell identifying information of the first cell based on the synchronization signal information.

3. The mobile transceiver according to claim 2, wherein the control module is configured to detect the synchronization signal information according to a primary and a secondary synchronization channel broadcast by the first cell.

4. The mobile transceiver according to claim 2, wherein the control module is configured to estimate the interfering signal information using blind detection.

5. The mobile transceiver according to claim 2, wherein the control module is configured to detect the synchronization signal information by cancelling parts of the receive signal information based on the interfering signal information.

6. The mobile transceiver according to claim 2, wherein the control module is configured to identify a modulation order of an interfering symbol within the interfering signal, and estimating the interfering signal information based at least on the modulation order.

7. The mobile transceiver according to claim 6, wherein the control module is configured to identify the modulation order based on broadcast information from the second cell.

8. The mobile transceiver according to claim 7, wherein the control module is configured to estimate radio channel information between a transmitter of the interfering signal and the first transceiver, and wherein the control module is configured to estimate the interfering signal information based on the radio channel information and the modulation order.

9. The mobile transceiver according to claim 8, wherein the control module is configured to estimate the radio channel information between the transmitter of the interfering signal and the first transceiver based on one or more reference symbols comprised in the interfering signal.

10. The mobile transceiver according to claim 9, wherein the control module is configured to estimate the multiple radio channel information between multiple antenna ports of the transmitter of the interfering signal and the first transceiver based on different symbols comprised in the interfering signal.

11. The mobile transceiver according to claim 2, wherein the control module is configured to:

transform the receive signal to the frequency domain based on an estimated timing of the interfering signal,
estimate a radio channel for the interfering signal based on pilot symbols comprised in the interfering signal,
detect a modulation order of symbols of the interfering signal,
demodulate interfering data from the receive signal based on the detected modulation order,
reconstruct a frequency domain interfering signal based on the demodulated interfering data,
reconstruct a time domain interfering signal from the frequency domain interfering signal,
subtract the interfering signal from the receive signal in the time domain to obtain a residual signal, and
perform cell search based on the residual signal.

12. The mobile transceiver according to claim 2, wherein the control module is configured to identify the first cell as part of a cell search procedure before accessing a data service of the mobile communication system.

13. The mobile transceiver according to claim 2, wherein the control module is configured to identify a plurality of cell identification information using reception quality measures for a plurality of synchronization channels, and wherein the control module is configured to determine the first cell identifying information for which a reception quality measure indicates a reception quality above a predetermined threshold.

14. The mobile transceiver according to claim 2, wherein the control module is configured to estimate precoding information applied to the interfering signal and to detect the synchronization signal information further based on the estimated precoding information.

15. The mobile transceiver according to claim 2, wherein the control module is configured to determine processing load information for determining the first cell identifying information and to provide the processing load information to the first cell of the mobile communication system.

16. A base station transceiver of a mobile communication system comprising an apparatus, the apparatus comprising:
an interface configured to provide transmit signal information; and
a control module configured to:
provide, via the interface, synchronization signal information of a synchronization signal to be transmitted on a frequency resource of the mobile communication system, and
provide, via the interface, broadcast signal information comprising symbol information of other signals using the frequency resource, wherein the symbol information comprises time alignment information or information indicative of a degree of synchronization of the synchronization signal and another synchronization signal transmitted by another transceiver.

17. The base station transceiver of claim 16, wherein the control module is configured to obtain processing load information for determining identification information of a cell, wherein the control module is configured to adjust an assisted interference cancellation mechanism based on the processing load information and to adapt a provision of the symbol information based on the processing load information.

18. The base station transceiver of claim 16, wherein the symbol information indicates a modulation order of symbols potentially interfering with the synchronization signal or another synchronization signal transmitted by another transceiver.

19. The base station transceiver of claim 16, wherein the symbol information of other signals using the frequency resource indicates symbols transmitted on the frequency resource and having a specific pre-coding or modulation.

* * * * *